United States Patent
Reese et al.

(10) Patent No.: US 10,410,211 B2
(45) Date of Patent: Sep. 10, 2019

(54) VIRTUAL POS TERMINAL METHOD AND APPARATUS

(71) Applicants: Kenneth W. Reese, Portland, OR (US); Mark H. Price, Placitas, NM (US)

(72) Inventors: Kenneth W. Reese, Portland, OR (US); Mark H. Price, Placitas, NM (US)

(73) Assignee: Intel Corporation, Santa Clara, CA (US)

( * ) Notice: Subject to any disclaimer, the term of this patent is extended or adjusted under 35 U.S.C. 154(b) by 876 days.

(21) Appl. No.: 14/739,911

(22) Filed: Jun. 15, 2015

(65) Prior Publication Data

US 2016/0364723 A1  Dec. 15, 2016

(51) Int. Cl.
  *G06Q 20/38* (2012.01)
  *G06Q 20/20* (2012.01)
  *G06Q 20/40* (2012.01)

(52) U.S. Cl.
  CPC ..... *G06Q 20/38215* (2013.01); *G06Q 20/206* (2013.01); *G06Q 20/4012* (2013.01)

(58) Field of Classification Search
  CPC ... G06Q 20/3821; G06Q 20/20; G06Q 20/401
  USPC .................................................. 705/35–45
  See application file for complete search history.

(56) References Cited

U.S. PATENT DOCUMENTS

| | | | | |
|---|---|---|---|---|
| 8,290,433 | B2 * | 10/2012 | Fisher | G06Q 20/32 455/41.1 |
| 9,852,426 | B2 * | 12/2017 | Bacastow | G06Q 20/4012 |
| 2009/0271276 | A1 * | 10/2009 | Roberts | G06Q 20/20 705/16 |
| 2015/0227916 | A1 * | 8/2015 | Inotay | G06Q 20/12 705/71 |
| 2015/0287031 | A1 * | 10/2015 | Radu | G06K 7/10009 705/18 |
| 2015/0324793 | A1 * | 11/2015 | Guise | G06Q 20/3829 705/71 |

(Continued)

OTHER PUBLICATIONS

Ross Anderson et al., "Cryptographic Processors—A Survey", Aug. 2005, 19 pages, University of Cambridge Computer Laboratory, UCAM-CL-TR-641, ISSN 1476-2986, Cambridge, United Kingdom.

(Continued)

*Primary Examiner* — Robert R Niquette
(74) *Attorney, Agent, or Firm* — Schwabe, Williamson & Wyatt, P.C.

(57) ABSTRACT

Methods, systems, and storage media are described for processing point of sale (POS) transactions. In embodiments, a computing device may receive a transaction initiation, and provide a selection of a payment credential to be used to process a POS transaction. The computing device may include a trusted execution environment to process the POS transaction in response to the selection of the payment credential. The trusted execution environment may comprise a payment credential storage unit to store payment credentials and a virtual POS terminal that may validate a merchant terminal associated with the transaction initiation, process the POS transaction using the selected payment credential to generate payment data, and encrypt the payment data. The computing device may communicate the encrypted payment data to a cloud POS service for further processing. Other embodiments may be described and/or claimed.

25 Claims, 16 Drawing Sheets

(56) References Cited

U.S. PATENT DOCUMENTS

| | | | |
|---|---|---|---|
| 2016/0358146 A1* | 12/2016 | Berrio | G06Q 20/10 |
| 2016/0364713 A1* | 12/2016 | Kingsborough | G06Q 20/10 |
| 2017/0161735 A1* | 6/2017 | Ortiz | G06Q 20/3278 |
| 2018/0018661 A1* | 1/2018 | Murphy | G06Q 20/3278 |

OTHER PUBLICATIONS

"EMV—Integrated Circuit Card Specifications for Payment Systems: Book 1 Application Independent ICC to Terminal Interface Requirements", Nov. 2011, 189 pages, Version 4.3.

"EMV—Integrated Circuit Card Specifications for Payment Systems: Book 2 Security and Key Management", Nov. 2011, 174 pages, Version 4.3.

"EMV—Integrated Circuit Card Specifications for Payment Systems: Book 3 Application Specification", Nov. 2011, 230 pages, Version 4.3.

"EMV—Integrated Circuit Card Specifications for Payment Systems: Book 4 Cardholder, Attendant, and Acquirer Interface Requirements", Nov. 2011, 154 pages, Version 4.3.

Dr. Ing. Ahmad-Reza Sadeghi, "Trusted Execution Environments Intel SGX", 2014, 35 pages, Germany.

"Payments 101: Credit and Debt Card Payments", Oct. 2010, 16 pages, A First Data White Paper, firstdata.com.

"Payment Card Industry (PCI) PIN Security Requirements", Sep. 2011, 86 pages, Version 1.0, PCI Security Standards Council.

"Security Rules and Procedures", Feb. 5, 2015, 149 pages, Merchant Edition, MasterCard.

Paul Carbin, "Intel Identity Protection Technology with PKI—Technology Overview", May 22, 2012, 26 pages, Rev. 1.0.

* cited by examiner

VIRTUAL POS TERMINAL METHOD AND APPARATUS

FIELD

The present disclosure relates to the technical field of electronic transactions, and in particular, to apparatuses, methods and storage media for providing a virtual point of sale (POS) terminal.

BACKGROUND

In today's world of commerce there are two dominant methods of making purchases. One is categorized as "card-present", where the card holder and payment card are physically present at the time of transaction, and the other is "card-not-present", where the card holder is not physically present during the transaction. The former transactions typically occur at a physical establishment (e.g., store, restaurant, gas station, etc.), while the latter typically occur during making purchases over the Internet (also referred to as "ecommerce" purchases) or making purchases via phone or mail-order. Card-present transactions typically enjoy far less fraud than card-not-present transactions. This is often attributed to the ability to prove credential authenticity (i.e., authenticity of the payment card being used) and card holder legitimacy (i.e., the individual making the transaction is the card holder or an authorized agent of the card holder). The enforcement of these two attributes is typically the responsibility of a physical point of sale (POS) terminal and/or other like computing device that can verify correctness of the information contained on the card and identity authentication, which is generally a personal identification number (PIN), a card holder signature, and the like.

Most ecommerce transactions require a user to input payment card information and cardholder identification information into text fields of a web-based user interface. Additionally, most phone-order purchase require customers to recite payment card information and cardholder identification information over the phone. This is because in most card-not-present transactions, the terminal-based authentication methods are usually not available. Furthermore, most current fraud prevention measures for card-not-present transactions, such as typing/reciting the account number contained on the front of a payment card plus other identifying information like a 3-digit cardholder verification value (CVV) on the back of most payment cards, have been demonstrated to not reduce fraud to the level experienced by card-present transactions. Moreover, the attempts to strengthen cardholder presence assurances for card-not-present transactions has resulted in the introduction of online authentication protocols, such as the XML-based 3D Secure (which is also known by various trade names including Visa® Verified by Visa, MasterCard® SecureCode, American Express® SafeKey, and JCP International® J/Secure). These protocols introduce an additional authentication step in the payment checkout process that verifies cardholder identity through the card-issuing bank. However, the additional verification steps introduced by the aforementioned protocols tend to result in customer frustration in the form of online shopping cart abandonment, which may lead to a loss of revenue for ecommerce merchants.

Accordingly, it may be desirable to bring the user experience and transaction security aspects of a physical POS terminal (i.e., card-present transactions) to online, phone-order, and/or mail-order transactions (i.e., card-not-present transactions). Furthermore, it may be desirable to provide transaction security for card-not-present transactions while reducing a number of steps for providing payment card verification and cardholder authorization.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
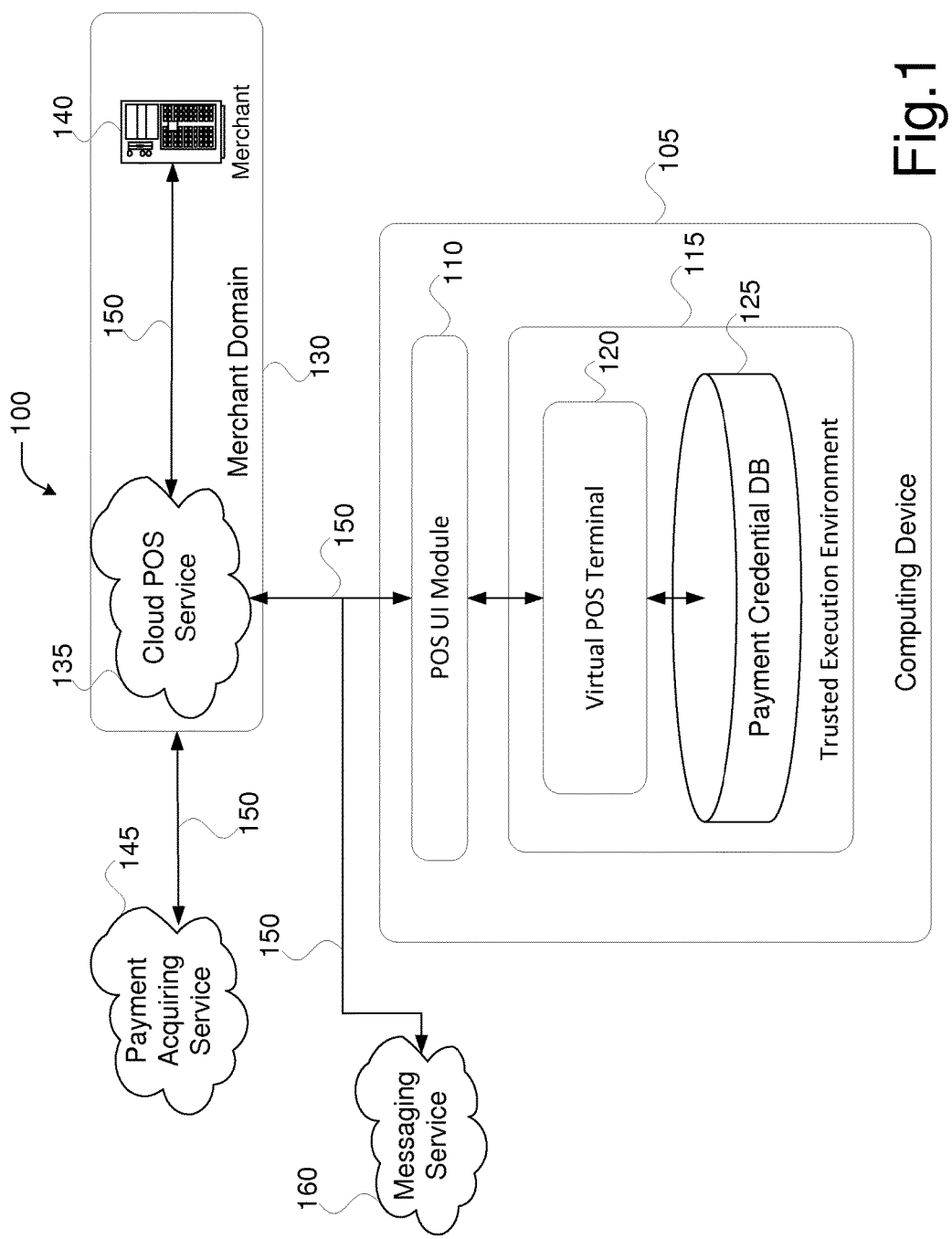
FIG. 1 illustrates an arrangement for conducting electronic transaction with virtual POS terminal of the present disclosure, in accordance with various example embodiments.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "mobile device" may be considered synonymous to, and may hereafter be occasionally referred to, as a client, mobile, mobile unit, mobile terminal, mobile station, mobile user, user equipment (UE), user terminal, subscriber, user, remote station, access agent, user agent, receiver, etc., and may describe a remote user of network resources in a communications network. Furthermore, the term "mobile device" may include any type of wireless device such as consumer electronics devices, smart phones, tablet personal computers, wearable computing devices, personal digital assistants (PDAs), laptop computers, and/or any other like physical computing device that is able to connect to a communications network.

As used herein, the term "network element", may be considered synonymous to and/or referred to as a networked computer, networking hardware, network equipment, router, switch, hub, bridge, gateway, and/or other like device. The term "network element" may describe a physical computing device of a wired or wireless communication network that is configured to host a client device and the like. Furthermore, the term "network element" may describe equipment that provides radio baseband functions for data and/or voice connectivity between a network and one or more users.

Example embodiments disclosed herein provide systems and methods for bringing a user experience and transaction security aspects of a physical point of sale (POS) terminal or other like card-present transactions to card-not-present transactions, such as online transactions, phone-order transactions, and/or mail-order transactions. The example embodiments allow users to remain in control of payment credentials during card-not-present transactions. For example, most online payment methods require users to entrust their account and/or banking information to an online service provider, such as an online payment system, online money transfer service, digital wallet service, and/or other like entities. Unlike the typical online payment methods, the example embodiments allow users to maintain their own payment credentials, whether stored locally with a trusted execution environment of their own computing device or stored within a trusted cloud computing environment, and provide the payment credentials to a merchant in encrypted form (or without having to share the payment credentials in an unencrypted form). Furthermore, unlike digital wallet services (e.g., ApplePay®, Visa Checkout®, etc.), various example embodiments, may not require a server-side digital wallet (i.e., a thin wallet) to be created and/or maintained on a server for each user.

The example embodiments provide a trusted execution environment on a computing device, which includes a virtual POS terminal instead of requiring a separate standalone physical POS terminal for swiping payment cards and/or entering payment card information. In various embodiments, the trusted execution environment may include one or more processors, which are separate from an application processor of the computing device, to process POS transactions. In other embodiments, the trusted execution environment may be provided as a new mode of execution on an existing processor. In some embodiments, the trusted execution environment may be provided as a cloud computing service that is separate from the user's computing devices. Examples of trusted execution environments may include a Trusted Execution Technology (TXT) provided by Intel®, a Management Engine (ME) provided by Intel®, one or more Secure Enclaves using Software Guard Extensions (SGX) provided by Intel®, a Converged Security Engine (CSE) provided by Intel®, and/or other like trusted execution environments and/or services.

In various example embodiments, the trusted execution environment also includes the various payment credentials, which may indicate one or more methods of payment associated with a user, such as credit card information, bank account information, and the like. When a merchant initiates a payment request, such as after a user performs an online checkout process, the virtual POS terminal in the trusted execution environment may perform various tasks that a standalone physical POS terminal may perform, such as PIN authorization, transaction settlement authorization, and the like. In addition to the typical functionality of a standalone physical POS terminal, example embodiments provide that each payment credential may indicate its own requirements for authenticating entities and/or processing a POS transaction.

Furthermore, according to various example embodiments, the virtual POS terminal may be accessible through a POS user interface (UI). Additionally, a merchant may have its own POS system that allows the user or merchant to enter the user's cellphone number to initiate a transaction. For example, a web-based store may provide a UI that allows a user to directly access the virtual POS terminal via the user's own POS UI that is rendered in the user's web browser. In this way, the user may be able to provide payment using one or more payment credentials without entering payment information and/or authentication information into a web-based UI. By way of another example, a telephone or mail-order merchant may acquire payment from a user by entering the user's cellphone number into their own POS system rather than requiring the user to dictate payment card information and/or cardholder authentication information over the phone. The merchant's POS system may either call the user's cellphone or send a text message to the cellphone, which may initiate the POS transaction, and the user may use the POS UI to select a payment credential for processing the POS transaction.

Referring now to the figures. FIG. 1 shows an arrangement 100 in which a point of sale (POS) transaction may be processed using the virtual POS terminal of the present disclosure, in accordance with various example embodiments. As shown in FIG. 1, arrangement 100 may include computing device 105, merchant domain 130, payment acquiring service 145, messaging service 160, and network 150. Additionally, computing device 105 may include POS user interface (UI) module 110 and trusted execution environment 115. The trusted execution environment may include virtual POS terminal 120 and payment credential database (DB) 125. Furthermore, the merchant domain may include a cloud POS service 135 and a merchant server 140 (also referred to as "merchant 140").

Computing device 105 may be physical hardware device capable of communicating with a one or more other hardware computing devices (e.g., merchant 140, one or more devices associated with cloud POS service 135, one or more associated databases (not shown), and the like) via a communications interface, such that computing device 105 is able to receive one or more signals and/or data streams from the other hardware computing devices. Computing device 105 may include one or more memory devices and one or more processors (not shown). Computing device 105 may be designed to sequentially and automatically carry out a sequence of arithmetic or logical operations; equipped to record/store digital data on a machine readable medium; and transmit and receive digital data via one or more network devices. Computing device 105 may be a desktop personal computer (PC), a laptop PC, a cellphone and/or smartphone, a tablet personal computer, a wearable computing device, a video game console, a digital media player, an in-vehicle infotainment (IVI) and/or an in-car entertainment (ICE) device, a handheld messaging device, a personal data assistant, an electronic book reader, an augmented reality device, and the like. It should be noted that the computing device 105 may be any physical or logical device capable of recording, storing, and/or transferring digital data via a connection to a network element.

In various embodiments, the computing device 105 may include a network interface (e.g., network interface 230 described with regard to FIGS. 2-3) configured to connect computing device 105 to one or more other hardware computing devices wirelessly via a transmitter and a receiver (or optionally a transceiver) and/or via a wired connection using a communications port. Computing device 105 may be configured to send/receive data to/from one or more other hardware computing devices, and/or network devices, such as a router, switch, hub, or other like network devices, via the network interface using the wired connection and/or the wireless connection. Computing device 105 may be configured to obtain a POS transaction initiation from a network element via the network interface, and process a POS transaction based on the POS transaction initiation according to the example embodiments described herein. In embodiments where the computing device 105 includes a transmitter/receiver (or alternatively, a transceiver), computing device 105 may be configured to communicate (i.e., send/receive data to/from a network element and/or other like devices) over the network 150 in accordance with one or more wireless communications protocols and/or one or more cellular phone communications protocols. For example, computing device 105 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, IEEE 802.11ad, and/or IEEE 802.11n, voice over Internet Protocol (VoIP), Wi-MAX, Long Term Evolution (LTE), and/or any other "wireless" communication protocols, including RF-based, optical, and so forth.

Computing device 105 may include one or more sensors, such as an accelerometer, gyroscope, gravimeter, magnetometer, and/or another like devices. The one or more sensors may be configured to detect the one or more gestures. The one or more gestures may include various touches (or combination of touches) applied to a touchscreen of the computing device 105, one or more spatial coordinates (or changes in spatial coordinates) of positions and/or orientations of the computing device 105. In such embodiments, the computing device 105 may track a timing and/or sequence that one or more gestures are performed, which may be used as a gesture-based passcode or password for authenticating the user's identity. In some embodiments, the one or more sensors may include a microphone configured to obtain one or more voice commands issued by a user of the computing device 105, wherein the voice commands are used to authenticate the user's identity. In such embodiments, the verbal commands may be a passcode and/or the computing device 105 may perform voice recognition to authenticate the user. In some embodiments, the one or more sensors may include one or more biometric sensors, such as an infrared heart rate monitoring device, a fingerprint or handprint scanning device, a face and/or an eye scanning device (e.g., a camera or other like image sensor), an electromyography (EMG) device for detecting electrical patterns associated with a user's muscular contractions, an electroencephalograph (EEG) device for measuring and/or recording electrical signals produced by a user's brain, and the like. In such embodiments, biometric data detected or sensed by the one or more biometric sensors may be used to authenticate a user's identity.

Computing device 105 may be configured to run, execute, or otherwise operate one or more applications. According to various example embodiments, the one or more applications may include the POS UI module 110, the modules within the trusted execution environment 115, and/or the trusted execution environment 115 itself. The one or more applications may include native applications, web applications, and hybrid applications. The native applications may be used for operating the computing device 105, such as using a camera or other like sensor of the computing device 105, GPS functionality of the computing device 105, an accelerometer of the computing device 105, cellular phone functionality of the computing device 105, and other like functions of the computing device 105. Native applications may be platform or operating system (OS) specific. Native applications may be developed for a specific platform using platform-specific development tools, programming languages, and the like. Such platform-specific development tools and/or programming languages may be provided by a platform vendor. Native applications may be pre-installed on computing device 105 during manufacturing, or provided to the computing device 105 by an application server (not shown) via a network (e.g. network 150). Web applications are applications that load into a web browser of the computing device 105 in response to requesting the web application from a service provider (e.g., web server 135). The web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders HTML. Hybrid applications may be a hybrid between native applications and web applications. Hybrid applications may be a standalone, skeletons, or other like application containers that may load a website within the application container. Hybrid applications may be written using website development tools and/or programming languages, such as HTML5, CSS, JavaScript, and the like. Hybrid applications use browser engine of the computing device 105, without using a web browser of the computing device 105, to render a website's services locally. Hybrid applications may also access mobile device capabilities that are not accessible in web applications, such as the accelerometer, camera, local storage, and the like. According to various embodiments, the POS UI module 110 may be a native application, web application, or a hybrid application. In many embodiments, the trusted execution environment 115 may be a native application, which may operate in conjunction with a specialized computer processing device.

POS UI module 110 may be one or more software modules that operate in conjunction with one or more hardware devices (e.g., processor 210 as described with regard to FIGS. 2-3) to provide a user of the computing device 105 with the ability to process a POS transaction using the computing device 105. In this way, the user of the computing device 105 may use the POS UI module 110 to interact with the virtual POS terminal 120 within the trusted execution environment 115. The POS UI module 110 may be implemented using one or more graphical control elements, graphical icons, visual indicators, and/or text based commands. UIs and/or GUIs, and their typical functionality are generally well-known, and thus, a further detailed description of the typical functionality of POS UI module 110 is omitted. However, it should be noted that according to various embodiments, the POS UI module 110 may be the only element that is outside of the trusted execution environment that is capable of communicating with elements within the trusted execution environment 115. For example, the POS UI module 110 may be configured to communicate with the virtual POS terminal 120 as shown in FIG. 1 and as described with regards to FIGS. 13-14. In such embodiments, the POS UI module 110 may communicate with elements within the trusted execution environment according to a security application programming interface (API), one or more software guard extension (SGX) instructions, and the like. Furthermore, the POS UI module 110 may be configured to communicate POS transaction related data with the cloud POS service 135 as described with regards to FIGS. 13-14.

Trusted execution environment 115 may be a physical hardware device that are separate from other components of the computing device 105 (e.g., as described with regard to FIG. 2), or may be one or more software modules that operate in conjunction with one or more hardware devices (e.g., as described with regard to FIG. 3) to carry out secure operations and/or control the storage and use of personal and/or confidential data. In various embodiments, trusted execution environment 115 may include one or more physically tamper-resistant embedded processors and memory devices that communicate with a conventional processor the computing device 105. In such embodiments, applications that are not within the trusted execution environment (e.g., POS UI module 110) may communicate with the physically tamper-resistant embedded processors and memory devices via a security application programming interface (API). In various embodiments, the trusted execution environment 115 may include a secure cryptoprocessor, which is a dedicated computer on a chip or a microprocessor designed to secure hardware by integrating cryptographic keys into devices and/or components of the computing device 105. In such embodiments, the trusted execution environment 115 may operate in accordance with the International Organization for Standardization (ISO) and International Electrotechnical Commission (IEC) specification ISO/IEC 11889:2009. In such embodiments, the trusted execution environment 115 may be a Trusted Platform Module (TPM) operating in conjunction with Trusted Execution Technology (TXT) provided by Intel®, a Management Engine operating in conjunction with Active Management Technology (AMT) provided by Intel®, a Converged Security Engine (CSE) provided by Intel®, and the like. An example of such embodiments is shown and described with regards to FIG. 2. In other embodiments, the trusted execution environment 115 may be one or more "enclaves" (also referred to as "secure enclaves") within the memory of the computing device 105. Secure enclaves may be isolated regions of code and/or data within the address space of a secure application. In most embodiments, only code executed within a secure enclave may access data within the same secure enclave, and the secure enclave may only be accessible using the secure application. In such embodiments, other applications may access the secure enclave via the secure application. Furthermore, the trusted execution environment 115 may be one or more secure enclaves defined using the Intel® Software Guard Extensions (Intel® SGX). An example of such embodiments is shown and described with regards to FIG. 3. As shown in FIG. 1, the trusted execution environment 115 may include virtual POS terminal 120 and payment credential database (DB) 125.

Virtual POS terminal 120 may be one or more software modules that operate in conjunction with one or more hardware devices (e.g., processor 310 as described with regard to FIG. 2, processor 210 as described with regard to FIG. 3, and the like) to interface with embedded payment credentials to obtain payment credential information, and interact with the POS UI module 110 and/or other like secure applications to obtain user inputs and information from the cloud POS service 135. The virtual POS terminal 120 may also validate and/or decrypt the user inputs and the information received from the cloud POS service 135 in order to authenticate a user of the computing device 105 and/or the merchant 140. Once a user has been successfully authenticated, the virtual POS terminal 120 may encrypt the obtained payment credential information and/or transaction signatures for subsequent transmission to an upstream payment processor (e.g., payment acquiring service 145). Furthermore, the virtual POS terminal 120 may generate POS transaction messages (which may be communicated via the POS UI module 110) in accordance with ISO 8583, which defines a standard for systems that exchange electronic transactions made by cardholders using payment cards.

Payment credential database (DB) 125 may be a hardware device or system for storing payment credentials and payment credential-related information for a plurality of payment credentials. The payment credential DB 125 may also be referred to as a "payment credential storage unit". In various embodiments, the payment credentials may be associated with a payment card issued to users for paying for goods and services (e.g., a credit card, charge card, debit card, electronic benefits transfer (EBT) cards, etc.). The payment credentials may be a digital/electronic version of a physical payment card, or the payment credentials may be digital/electronic payment credentials. The payment credential DB 125 may also store cardholder data or other like sensitive information belonging to an authorized user of a payment card, which may include a cardholder name, billing address, shipping address, payment card number, PIN, verification codes, security questions and answers (e.g., cardholder birthdate, mother's maiden name, etc.), and the like. Furthermore, the payment credential DB 125 may store payment credentials and authorization information in accordance with EMV (Europay, MasterCard, and Visa) standards, which define worldwide interoperability and acceptance standards for secure card-present and card-not-present transactions. Moreover, in some embodiments, the payment credential DB 125 may store virtual currency information (e.g., Linden Dollars traded in the virtual online community Second Life®, one or more currencies exchanged in the massively multiplayer online role-playing game (MMORPG) World of Warcraft®, Amazon Coins®, Nintendo Points®, Facebook® Credits, frequent flyer miles, brick-and-mortar store rewards points, etc.), cryptocurrency information (e.g., bitcoins, litecoins, etc.) and/or other like information used as a medium of exchange. In such embodiments, the payment credentials stored in the payment credential DB 125 may include one or more digital currency wallets (e.g., a bitcoin wallet, etc.) and/or any other like mechanism for storing information necessary to account for digital currency transactions.

Payment credential DB 125 may include one or more relational database management systems (RDBMS) one or more object database management systems (ODBMS), a column-oriented DBMS, correlation database DBMS, and the like. According to various example embodiments, the payment credential DB 125 may be stored on or otherwise associated with one or more data storage devices. These data storage devices may include at least one of a non-volatile random-access memory (NVRAM) device, a read-only memory (ROM) device, a flash memory device, a solid state drive (SSD), and/or other like data storage devices. In various embodiments, payment credential DB 125 may be accessed by the virtual POS terminal 120 such that the virtual POS terminal 120 may query the payment credential DB 125 to obtain payment credential information and/or store payment credential information in the payment credential DB 125. In some embodiments, payment credential DB 125 may be physically and/or logically divided into multiple databases, while in other embodiments, the payment credential DB 125 may be a single database that resides on one physical hardware data storage device.

Merchant domain 130 may be a collection of devices, systems, and/or services that are utilized by a merchant (e.g., merchant 140) to engage with ecommerce-related activities. As shown merchant domain 130 may include merchant server 140 and cloud POS service 135.

Merchant server 140 (also referred to as "merchant 140") may be one or more hardware computing devices that may include one or more servers or other like network elements for providing one or more services. The one or more services may include selling products and/or services, providing an online market place for the purchase and/or sale of products and services, mining demographic data, online marketing, and/or other like ecommerce-related services. In this regard, the merchant 140 may engage with a user of the computing device 105 to sell products and/or services to the user, and utilize the cloud POS service 135 to initiate a POS transaction with the computing device 105. The merchant server 140 may include an operating system that may provide executable program instructions for the general administration and operation of merchant server 140, and may include a computer-readable medium storing instructions that, when executed by a processor of the merchant server 140, may allow the merchant server 140 to perform its intended functions. Suitable implementations for the operating system and general functionality of the servers are known or commercially available, and are readily implemented by persons having ordinary skill in the art, particularly in light of the disclosure herein. Furthermore, it should be understood that the merchant 140 may not be required and the applications and software components discussed herein may be executed on any appropriate device or host machine.

Cloud POS service 135 may be one or more hardware computing devices that may include one or more servers or other like network elements for providing one or more services. The one or more services provided by the cloud POS service 135 may include initiating a POS transaction with a client device that is enabled to process POS transactions (e.g., computing device 105), authenticating payment information and/or user identity information, and providing POS transaction-related information to the computing device 105 to process a POS transaction. In this regard, cloud POS service 135 may communicate data (i.e., transmit and receive) with POS UI module 110, and thus, may communicate to virtual POS terminal 120 securely and indirectly through the POS UI module 110. Additionally, the cloud POS service 135 may communicate data (i.e., transmit and receive) with the merchant 140 and/or the payment acquiring service 145 purposes of processing POS transactions. In order to communicate with the POS UI module 110, the merchant 140, and/or the payment acquiring service 145, the cloud POS service 135 may generate POS transaction messages (which may be communicated to the POS UI module 110) in accordance with ISO 8583, which defines a standard for systems that exchange electronic transactions made by cardholders using payment cards.

The cloud POS service 135 may be integrated with a payment system that is implemented by the merchant 140, and may capture POS transaction details for analysis and reporting to the merchant 140. In some embodiments, the cloud POS service 135 may be a standalone service such that the cloud POS service 135 is implemented separately from the merchant domain 130. In this way, the cloud POS service 135 may be hosted by an independent entity that may provide the cloud POS service 135 to a plurality of merchant services simultaneously. It should be noted that typical digital wallet services and/or online money transfer services may be hosted by an independent entity that provides their services to a plurality of merchants simultaneously However, unlike the typical digital wallet services and/or online money transfer services, in various embodiments the cloud POS service 135 may not have to retain user payment information and user identification information. Instead, the cloud POS service 135 may allow users to retain possession and control of their personal account information and personally identifying information. Therefore, the cloud POS service 135 may provide network and computational resource efficiencies while also providing user privacy protections. Furthermore, because typical card-not-present transactions usually have a higher rate of fraud, merchants are usually charged higher bank processing fees and/or are required to absorb costs associated with data breaches and/or fraudulent transactions. Therefore, merchants are usually responsible for processing payments and providing security measures for handling payment information for typical card-not-present transaction. Accordingly, merchants that utilize the cloud POS service 135 could end up paying a lower transaction fee to process payments through the cloud POS service 135 (including the virtual POS terminal 120) rather than processing payments on their own.

The cloud POS service 135 may include an operating system that may provide executable program instructions for the general administration and operation of payment acquiring service 145, and may include a computer-readable medium storing instructions that, when executed by a processor of the application server 130, may allow the payment acquiring service 145 to perform its intended functions. Suitable implementations for the operating system and general functionality of the servers are known or commercially available, and are readily implemented by persons having ordinary skill in the art, particularly in light of the disclosure herein. Furthermore, it should be understood that the payment acquiring service 145 may not be required and the applications and software components discussed herein may be executed on any appropriate device or host machine.

Network 150 may be any network that allows computers to exchange data. Network 150 may include one or more network elements (not shown) capable of physically or logically connecting computers. The network 150 may include any appropriate network, including an intranet, the Internet, a cellular network, a local area network (LAN), a wide area network (WAN), a personal network or any other such network or combination thereof. Components used for such a system can depend at least in part upon the type of network and/or environment selected. Protocols and components for communicating via such a network are well known and will not be discussed herein in detail. Communication over the network 150 may be enabled by wired or wireless connections, and combinations thereof.

Payment acquiring service 145 may be one or more hardware computing devices that may include one or more servers or other like network elements for providing one or more services. The payment acquiring service 145 may be a financial institution, bank, and/or other like entity or group of entities that is able to process payment credential purchases on behalf of a merchant (e.g., merchant 140). In some embodiments, the payment acquiring service 145 may be referred to as a "merchant bank", "acquirer", and the like. The payment acquiring service 145 may be contacted by the cloud POS service 135 to authorize a payment card purchase amount. The payment acquiring service 145 may be able to approve or decline a payment credential purchase amount, and if approved, the payment acquiring service 145 may settle the transaction by placing the funds into an account associated with the merchant 140. The payment acquiring service 145 may include an operating system that may provide executable program instructions for the general administration and operation of payment acquiring service 145, and may include a computer-readable medium storing instructions that, when executed by a processor of the application server 130, may allow the payment acquiring service 145 to perform its intended functions. Suitable implementations for the operating system and general functionality of the servers are known or commercially available, and are readily implemented by persons having ordinary skill in the art, particularly in light of the disclosure herein.

Messaging service 160 may be one or more hardware computing devices that may include one or more servers or other like network elements for providing one or more services. The messaging service 160 may be a service that forwards or otherwise provides notifications and/or other like messages from third parties to client devices (e.g., computing device 105). In such embodiments, the notifications or messages may be push notifications communicated in accordance with the Push Access Protocol (PAP), simple mail transfer protocol (SMTP), Extensible Messaging and Presence Protocol (XMPP), and/or other like push communication protocols. Such notifications or messages may include audio/video messages, text alerts, and/or the like. The messaging service 160 may be contacted by the cloud POS service 135 to provide a POS transaction initiation message to the computing device 105 on behalf of the cloud POS service 135. In various embodiments, the messaging service 160 may be a mobile messaging service, such as Google Cloud Messaging (GCM), Apple Push Notification Services and/or Notification Center, Windows Push Notification Service (WNS), and/or other like messaging services.

The arrangement 100 may be implemented according to one or more of the following use cases.

Use case 1: ecommerce or web-based purchases. According to use case 1, the virtual POS terminal 120 may be accessible by rendering the POS UI module 110 in a standard web browser. When the user of the computing device 105 goes through an ecommerce checkout process, the user may be asked to make an ecommerce payment. At this point, the cloud POS service 135, operating in conjunction with the ecommerce checkout process provided by the merchant 140, may solicit the POS transaction through the POS UI module 110 rendered in the web browser. A variant of use case 1 may include out-of-band ecommerce transactions, such as those performed on untrusted or otherwise unsecure computing devices. In such instances, when the user is asked to provide payment, the user may provide a unique identifier (e.g., e.g., mobile phone number, an email address, and/or any other user-related identifier) associated with a computing device enable to process POS transactions (e.g., computing device 105) instead of entering payment information directly into a web browser of an untrusted computing device. Once the user enters the phone number, email address, etc. of the computing device enabled to process POS transactions the transaction initiation message may be sent to the computing device 105 via the cloud POS service 135 and/or messaging service 160, instructing computing device 105 to process the POS transaction.

Use case 2: mail-order and/or telephone-order purchases. Telephone-order transactions traditionally require customers to dictate payment information over the phone to an agent of a merchant in order to purchase a product or service. According to use case 2, a user of the computing device 105 may order a product or service over the phone. However, instead of requiring the user to dictate payment information over the phone, the user may provide a unique identifier (e.g., mobile phone number, an email address, and/or any other user-related identifier) to the merchant 140 (or an agent of the merchant 140). The merchant 140 (or an agent of the merchant 140) may enter the unique identifier into a merchant terminal that is enabled to interact with the cloud POS service 135, and the cloud POS service 135 and/or messaging service 160 may send a transaction initiation to the computing device 105. The POS transaction may then be processed according to the various example embodiments disclosed herein. For mail-order purchases, which typically require a customer to write down payment information on a paper order form, the customer may manually write the unique identifier on the paper order form instead of writing payment information and/or authentication information into the order form. When the order form reaches the merchant 140, the unique identifier may be entered into a merchant terminal enabled to interact with the cloud POS service 135, which may immediately send a transaction initiation to the computing device 105 via the cloud POS service 135. When the merchant receives payment confirmation from the computing device 105, the merchant 140 may fulfill (e.g., ship) the ordered product or service.

Use case 3: brick-and-mortar purchases. Most brick-and-mortar transactions require customers to enter payment information into a standalone physical POS terminal (also referred to as a credit card terminal, payment terminal, electronic funds transfer (EFT) POS terminal, etc.) to purchase a product or service. In most cases, the standalone physical POS terminals allow customers or merchants to insert, swipe, or manually enter the required payment information. According to use case 3, the user of the computing device 105 may provide a unique identifier to a brick-and-mortar store employee, who may then enter the unique identifier into a merchant terminal enabled to interact with the cloud POS service 135.

A variant of use case 3 may involve other physical outlets that may not have a typical standalone physical POS terminal. These other physical outlets may include merchants at farmers' markets, trade shows, swap meets, flea markets, bazaars, conventions, concerts, and the like. Typically, merchants of these other physical outlets may have a computing device, such as a smartphone or tablet PC, which may mimic or replace the functionality of the standalone physical POS terminal hardware using a terminal application running on a the computing device. These terminal applications usually require manual entry of payment information, or may operate in conjunction with a peripheral hardware payment card reader that can transfer payment information to the terminal application. Such peripheral payment card readers may connect to the merchant's computing device through an audio jack of the computing device. Since these terminal applications typically mimic the standalone physical POS terminals, they often present the same or similar security concerns that apply to the standalone physical POS terminals. According to the variant of use case 3, the merchant's computing device may include its own POS UI that may interact with the cloud POS service 135, and a user of the computing device 105 may manually enter or otherwise provide a unique identifier to the merchant's POS UI to initiate the POS transaction via the cloud POS service 135.

Use case 4: user-initiated donations. In some instances, a user may wish to make a donation or tithe to an entity, such as a non-profit organization. Rather than requiring the donation recipients to manually process card requests using standalone physical POS terminals or a terminal application as discussed with regard to use case 3, according to use case 4, the POS UI module 110 may allow a user of the computing device 105 to initiate and complete payment requests on their own. In various embodiments, the donation recipient may deploy a Bluetooth low-energy (BLE) beacon that broadcasts one or more signals, which indicate that a POS payment may be made at a physical location. When the computing device 105 obtains the one or more BLE signals, the computing device 105 may indicate that a POS payment point associated with the donation recipient is nearby, and the user of the computing device 105 may execute the POS UI module 110 to initiate a POS transaction according to the example embodiments disclosed herein. It should be noted that a variant of use case 4 may involve deploying BLE beacons in brick-and-mortar stores or other like physical outlets to facilitate the purchase of products or services, rather than requiring an employee to perform a checkout process and the like.

Figure 2:
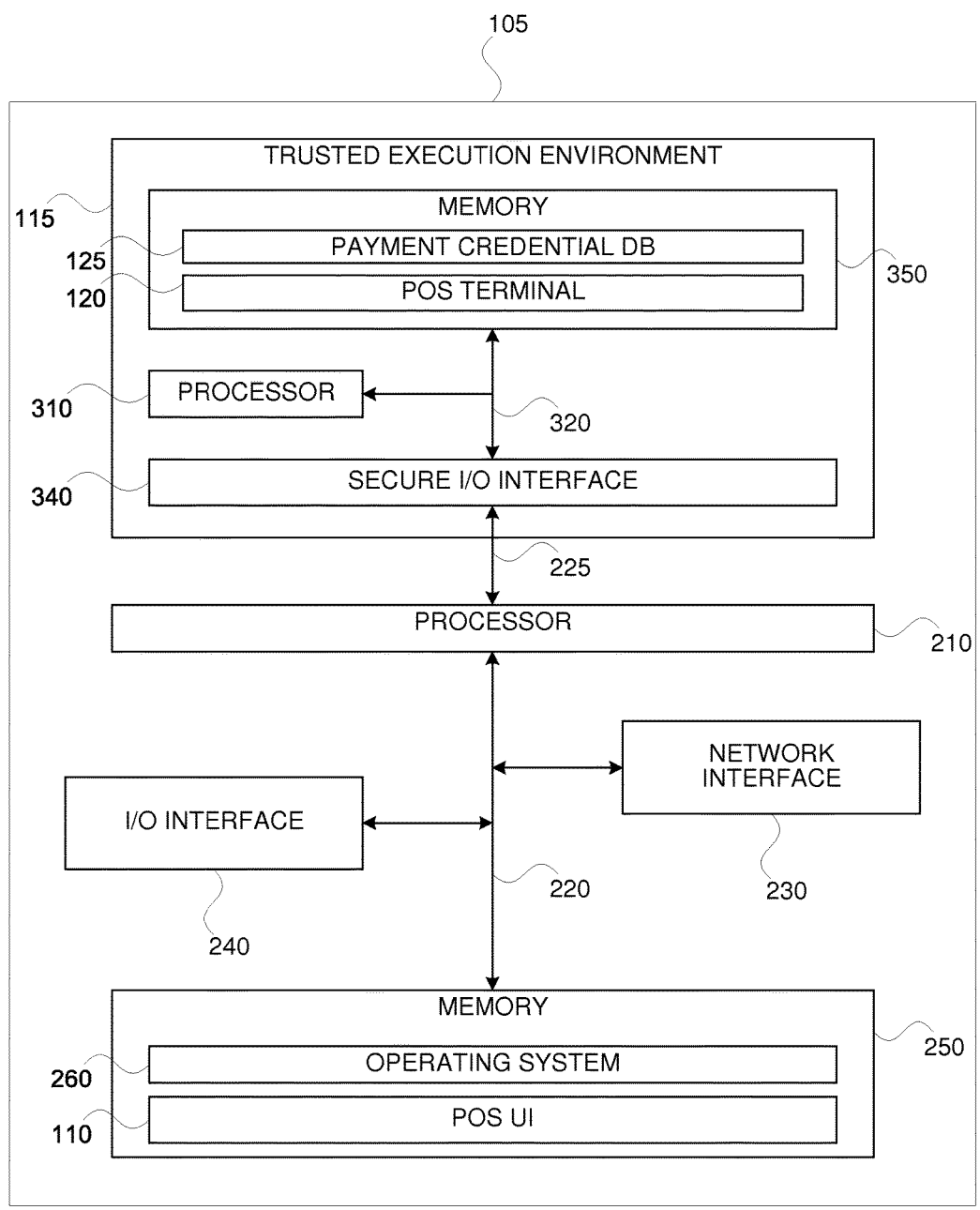
FIG. 2 illustrates the components of an example computing device having the virtual POS terminal, in accordance with various example embodiments.

FIG. 2 illustrates the components of the computing device 105, in accordance with various example embodiments. As shown, computing device 105 may include processor 210, bus 220, network interface 230, input/output (I/O) interface 240, memory 250, and trusted execution environment 115. As shown, trusted execution environment 115 may include memory 350 and processor 310. In some embodiments, computing device 105 may include many more components than those shown in FIG. 2, such as a display device (e.g., a computer monitor, a touchscreen, etc.), one or more input devices (e.g., a physical keyboard, a touch screen, etc.), one or more image sensors, a transmitter/receiver (or alternatively, a transceiver), a mobile video card and/or graphics processing unit (GPU), and other like components.

Memory 250 may be a hardware device configured to store an operating system 260 and program code for one or more software components, such as POS UI module 110 and/or one or more other applications. Memory 250 may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into memory 250 using a drive mechanism (not shown). Such separate computer readable storage medium may include a memory card, memory stick, removable flash drive, sim card, and/or other like computer readable storage medium (not shown). In some embodiments, software components may be loaded into memory 250 via network interface 230, rather than via a computer readable storage medium.

During operation, memory 250 may include operating system 260 and POS UI module 110. Operating system 260 may manage computer hardware and software resources and provide common services for computer programs. Operating system 260 may include one or more drivers, such as a display driver, sensor drivers (e.g., a camera driver, etc.), audio drivers, and/or any other like drivers that provide an interface to hardware devices without needing to know the details of the hardware itself According to various embodiments, the operating system 260 may include one or more drivers for accessing the trusted execution environment 115 thereby enabling POS UI module 110 to access hardware functions inside the trusted execution environment 115, such as the virtual POS terminal 120, without needing to know the details of the trusted execution environment 115 itself The operating system 260 may be a general purpose operating system or an operating system specifically written for and tailored to the computing device 105.

POS UI module 110 may be a collection of software modules and/or program code that enables the computing device 105 to access or obtain POS transaction data and/or other like data from the virtual POS terminal 120 within the trusted execution environment 115, and/or operate according to the various example embodiments as disclosed herein. POS UI module 110 may be a native application, a web application, or a hybrid application. In some embodiments, POS UI module 110 may be a web application that may be rendered in a web browser of the computing device 105.

Processor 210 may be configured to carry out instructions of a computer program by performing the basic arithmetical, logical, and input/output operations of the system. The term "processor" as used herein may refer to a physical central processing unit (CPU). The processor 210 may include a single-core processor, a dual-core processor, a triple-core processor, a quad-core processor, etc. The processor 210 may perform a variety of functions for the computing device 105 and may process data by executing program code, one or more software modules, firmware, middleware, microcode, hardware description languages, and/or any other like set of instructions stored in the memory 250. The program code may be provided to processor 210 by memory 250 via bus 220, one or more drive mechanisms (not shown), and/or via network interface 230. In order to perform the variety of functions and data processing operations, the program code and/or software components may be executed by the processor 210. On execution by the processor 210, the processor 210 may cause computing device 105 to perform the various operations and functions delineated by the program code.

For example, in various embodiments, the POS UI module 110 may include various modules and/or program code configured to operate (using hardware and/or software components) to obtain POS transaction data from the virtual POS terminal 120 and communicate various POS transaction-related data with the virtual POS terminal 120 and/or the cloud POS service 135 as described herein. Once the various modules and/or program code of the POS UI module 110 are loaded into memory 250 and executed by the processor 210, the processor 210 may be configured to cause computing device 105 to receive a transaction initiation from the cloud POS service 135 or other merchant-related terminal; provide a selected payment credential to be used to process a POS transaction; provide authentication parameters to the cloud POS service 135 or other merchant-related terminal; receive a cryptographic merchant certificate from the cloud POS service 135 or other merchant-related terminal, and provide the cryptographic merchant certificate to the virtual POS terminal 120; receive a personal identification (PIN) solicitation from the cloud POS service 135 or other merchant-related terminal; provide a user interface to allow a user of the computing device 105 to enter a PIN; receive the input PIN and provide the inputted PIN to the cloud POS service 135 or other merchant-related terminal; receive updated transaction terms from the cloud POS service 135 or other merchant-related terminal; receive encrypted payment data from the virtual POS terminal 120; communicate the encrypted payment data to the cloud POS service 135 or other merchant-related terminal; and/or perform various other functions or combinations of functions as disclosed herein. While specific modules are described herein, it should be recognized that, in various embodiments, various modules may be combined, separated into separate modules, and/or omitted. Additionally, in various embodiments, one or more modules may be implemented on separate devices, in separate locations, or distributed, individually or in sets, across multiple processors, devices, locations, and/or in cloud-computing implementations.

Bus 220 may be configured to enable the communication and data transfer between the processor 210 and memory 250. Bus 220 may comprise a high-speed serial bus, parallel bus, internal universal serial bus (USB), Front-Side-Bus (FSB), and/or other suitable communication technology for transferring data between components within computing device 105 and other like devices. I/O bus 225 may be configured to enable the communication and data transfer between the components of the computing device 105, such as between the trusted execution environment 115 and the processor 210. In various embodiments, the I/O bus 225 may be the same or similar as bus 220, while in some embodiments, I/O bus 225 may comprise a PCI bus, a PCI-Express (PCI-e) bus, a Small Computer System Interface (SCSI) bus, and the like.

Network interface 230 may be a computer hardware component that connects computing device 105 to a computer network (e.g., network 150). Network interface 230 may connect computing device 105 to a computer network via a wired or wireless connection. Network interface 230 may operate in conjunction with a wireless transmitter/receiver and/or transceiver (not shown) that is configured to operate in accordance with one or more wireless standards. The wireless transmitter/receiver and/or transceiver may be configured to operate in accordance with a wireless communications standard, such as the IEEE 802.11-2007 standard (802.11), the Bluetooth standard, and/or any other like wireless standards. The communications port may be configured to operate in accordance with a wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols). The network interface 230 may also include one or more virtual network interfaces configured to operate with POS UI module 110 and/or other like applications.

I/O interface 240 may be a computer hardware component that provides communication between the computing device 105 and one or more other devices. The I/O interface 240 may include one or more user interfaces designed to enable user interaction with the computing device 105 and/or peripheral component interfaces designed to provide interaction between the computing device 105 and one or more peripheral components. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

As discussed above, computing device 105 may also include a transmitter and receiver or a transceiver (not shown). The transmitter may be any type of hardware device that generates or otherwise produces radio waves in order to communicate with one or more other devices. The transmitter may be coupled with an antenna (not shown) in order to transmit data to one or more other devices. The transmitter may be configured to receive digital data from one or more components of computing device 105 via bus 220, and convert the received digital data into an analog signal for transmission over an air interface. The receiver may be any type of hardware device that can receive and convert a signal from a modulated radio wave into usable information, such as digital data. The receiver may be coupled with the antenna (not shown) in order to capture radio waves. The receiver may be configured to send digital data converted from a captured radio wave to one or more other components of computing device 105 via bus 220. In embodiments where a transceiver (not shown) is included with computing device 105, the transceiver may be a single component configured to provide the functionality of a transmitter and a receiver as discussed above.

Trusted execution environment 115 may be one or more hardware devices and software modules configured to carry out secure operations and/or control the storage and use of personal and/or confidential data. In various embodiments, the trusted execution environment 115 may be a single integrated circuit (IC) containing a processing device, memory, an internal bus, and/or an I/O interface. As shown by FIG. 2, the trusted execution environment 115 includes memory 350, processor 310, bus 320 and 325, and secure I/O interface 340.

Memory 350 may be a same type of device or similar hardware device as memory 250, such as RAM, ROM, a flash memory device, a SSD, and/or other like storage media capable of storing and recording data. However, according to various embodiments, the memory 350 may only be accessed (i.e., read and/or written to) by processor 310. In such embodiments, components that are external to trusted execution environment may access the memory 350 via secure I/O interface 340. Memory 350 may be configured to program code for one or more software components, such as virtual POS terminal 120, payment credential DB 125, and/or one or more other like applications. The program code and/or software components may be loaded into memory 350 from a separate computer readable storage medium, from memory 250, using a drive mechanism (not shown), network interface 230, and/or I/O interface 240 via the secure I/O interface 340.

Virtual POS terminal 120 may be a collection of software modules and/or program code that enables the computing device 105 to process POS transactions by validating and/or encrypting/decrypting POS transaction data, and/or otherwise operate according to the various example embodiments as disclosed herein. Virtual POS terminal 120 may be a native application or a firmware application. Payment credential DB 125 may be one or more databases that stores payment credentials in association with other payment credential-related information. As discussed elsewhere, the payment credential DB 125 may be one or more relational databases, one or more object databases, one or more column-oriented databases, one or more correlation databases, and/or the like.

Bus 320 may be a same type of device or similar to bus 220 and/or bus 225, for example, bus 320 may comprise a high-speed serial bus, parallel bus, internal USB, FSB, a PCI bus, a PCI-e bus, a SCSI bus, and/or other suitable communication technology for transferring data between components within trusted execution environment 115 and with components outside of trusted execution environment 115. In various embodiments, the processor 310 may be the same or similar as processor 210.

Processor 310 may be configured to carry out instructions of a computer program (e.g., virtual POS terminal 120) by performing the basic arithmetical, logical, and input/output operations. The processor 310 may include a single-core processor, a dual-core processor, a triple-core processor, a quad-core processor, one or more digital signal processor (DSP), an application-specific integrated circuit (ASIC) device, and/or the like. The processor 310 may perform a variety of functions for the computing device 105 and may process data by executing program code, one or more software modules, firmware, middleware, microcode, hardware description languages, and/or any other like set of instructions stored in the memory 350. The program code may be provided to processor 310 by memory 350 via bus 320, and/or by processor 210 via secure I/O interface 340. In order to perform the variety of functions and data processing operations, the program code and/or software components may be executed by the processor 310. On execution by the processor 310, the processor 310 may cause computing device 105 to perform the various operations and functions delineated by the program code.

For example, in various embodiments, the virtual POS terminal 120 may include various modules and/or program code configured to operate (using hardware and/or software components) to process POS transactions and communicate various POS transaction-related data with the cloud POS service 135 via the POS UI module 110 as described herein. Once the various modules and/or program code of the virtual POS terminal 120 are loaded into memory 350 and executed by the processor 310, the processor 310 may be configured to cause computing device 105 to obtain payment credentials and/or other like information from the payment credential DB 125; validate merchant terminals associated with a POS transaction by decrypting, deciphering, or otherwise decode merchant certificates; process POS transactions using the selected payment credentials; generate and encrypt payment data; and/or perform various other functions or combinations of functions as disclosed herein. While specific modules are described herein, it should be recognized that, in various embodiments, various modules may be combined, separated into separate modules, and/or omitted. Additionally, in various embodiments, one or more modules may be implemented on separate devices, in separate locations, or distributed, individually or in sets, across multiple processors, devices, locations, and/or in cloud-computing implementations.

In various embodiments, the trusted execution environment 115 may be a graphics and memory controller hub and the processor 310 and memory 350 may be part of microcontroller IC that includes the Management Engine firmware provided by Intel®. In some embodiments, the trusted execution environment 115 may be a Trusted Platform Module (TPM) provided by Intel® that operates in accordance with ISO/IEC 11889:2009, wherein the processor 310 is a secure cryptoprocessor. However, it should be noted that the trusted execution environment 115 may be any secure region of a computing device that may protect data that is stored and/or processed within the trusted execution environment 115.

Figure 3:
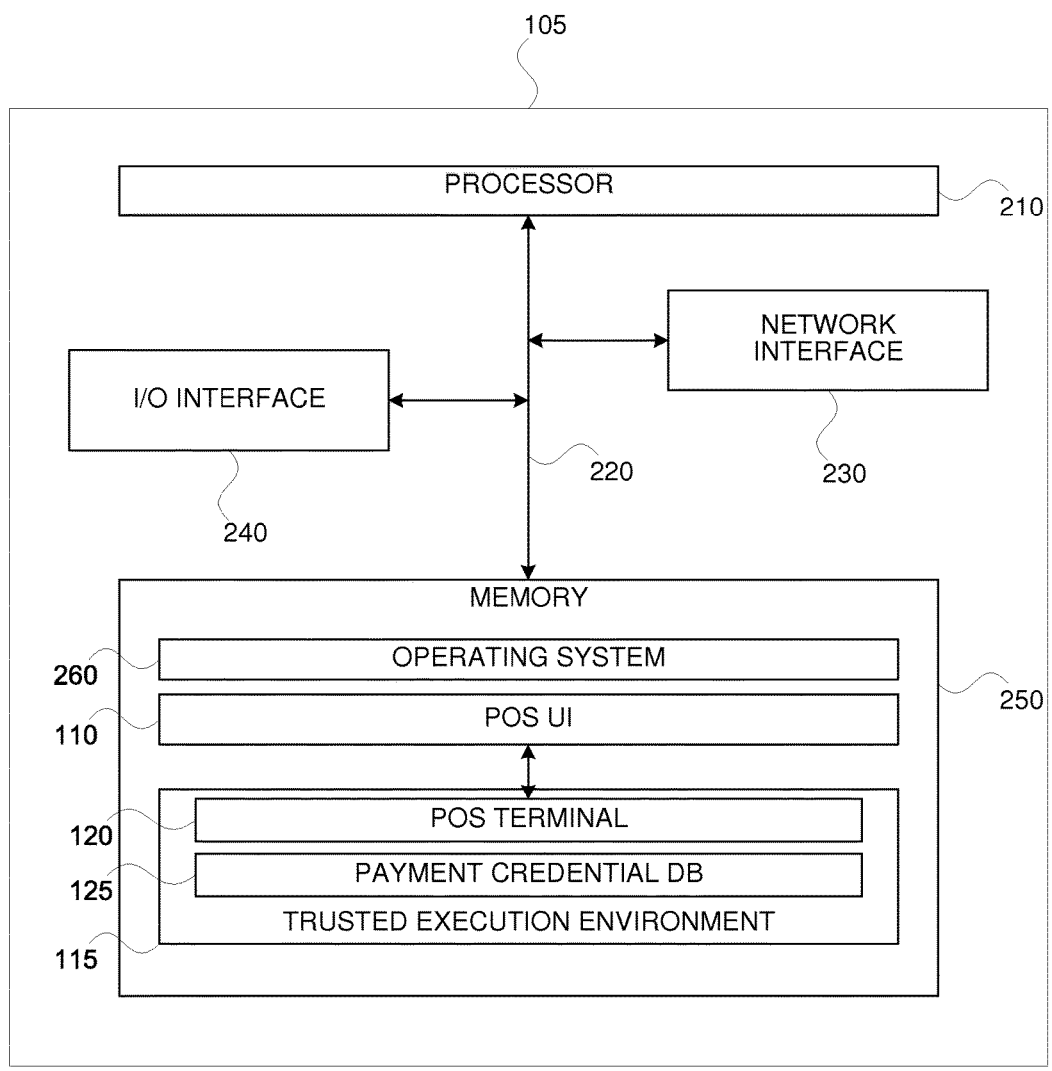
FIG. 3 illustrates the components of another example computing device with the virtual POS terminal, in accordance with various other example embodiments.

FIG. 3 illustrates the components of the computing device 105, in accordance with other various example embodiments. As shown by FIG. 3, computing device 105 may include similar components as shown by FIG. 2, such as processor 210, bus 220, network interface 230, input/output (I/O) interface 240, and memory 250, each of which may operate in a same or similar manner as discussed with regard to FIG. 2. However, according to the example embodiment shown by FIG. 3, the trusted execution environment 115 may be within memory 250. In some embodiments, computing device 105 may include many more components than those shown in FIG. 3, such as a display device (e.g., a computer monitor, a touchscreen, etc.), one or more input devices (e.g., a physical keyboard, a touch screen, etc.), one or more image sensors, a transmitter/receiver (or alternatively, a transceiver), a mobile video card and/or graphics processing unit (GPU), and other like components.

According to the example embodiment shown by FIG. 3, the trusted execution environment 115 may be a hardware enforceable container called an enclave, a secure enclave, and the like. The enclaves may be used to store security critical code and/or data, such as payment credentials and/or other POS transaction data. The enclaves may be one or more isolated regions of memory 250 that are encrypted within the memory 250. In some embodiments, the enclaves may be managed by a virtual machine monitor (VMM) of a virtual machine running as a guest operating system. The memory location of the enclaves may be protected from access by all hardware components and/or software components of computing device 105, regardless of a privilege level assigned to the hardware components and/or software components. In such embodiments, only the processor 210 executing a secure application (e.g., POS UI module 110) may access an enclave. In such embodiments, the operating system 260 may include a secure driver that provides an interface for hardware devices and/or software components to create secure applications; access enclaves created by the secure applications; create secure application certificates that allow one or more software components; hardware devices; or external computing devices to attest to validate their identity; create secure channels between multiple enclaves; and/or other like secure operations. In embodiments where the processor 210 is a multi-core processor, the processor 210 may execute program code from an enclave in parallel with unsecured program code. In various embodiments, the trusted execution environment 115 may be one or more secure enclaves defined using the Intel® Software Guard Extensions (Intel® SGX).

Figure 4:
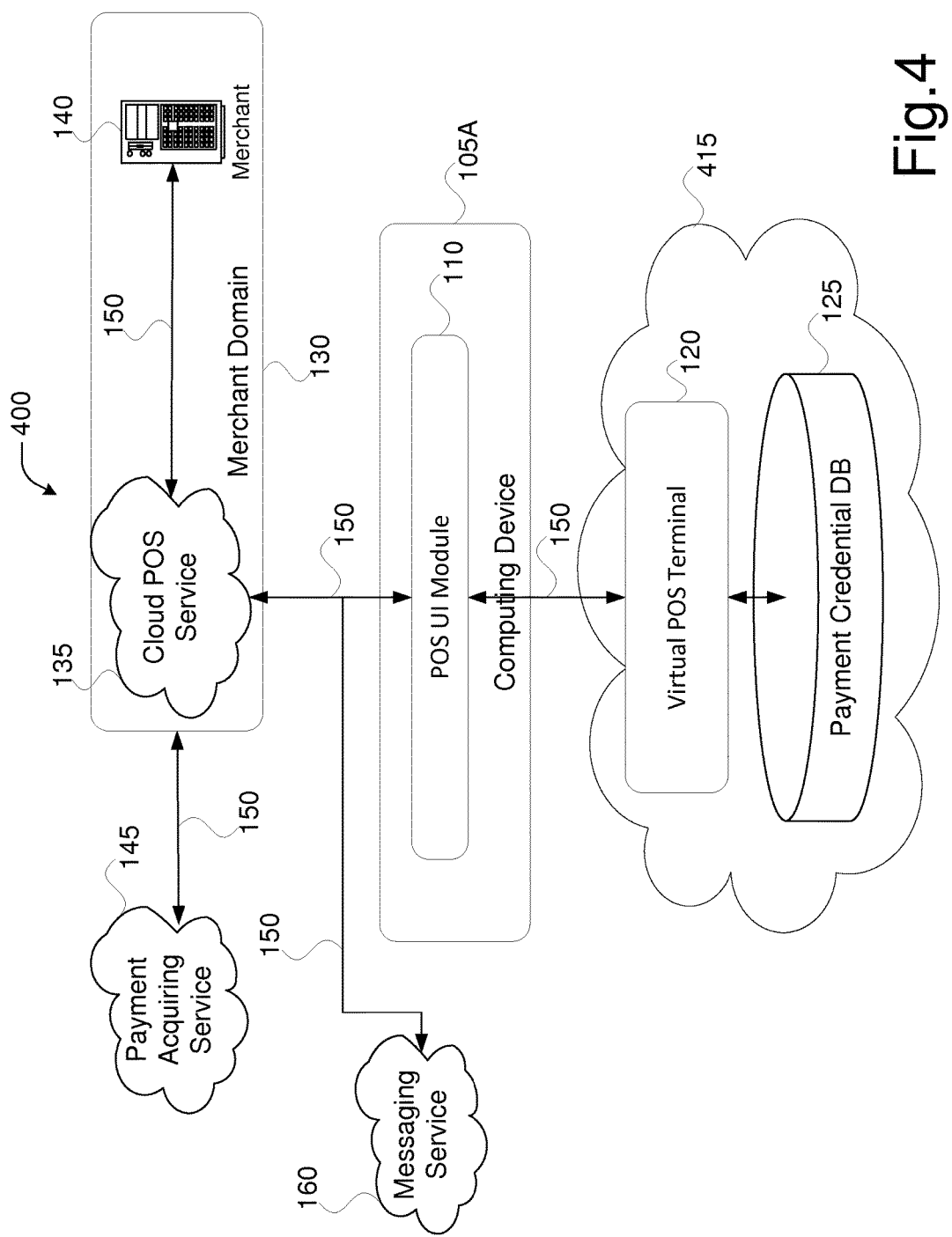
FIG. 4 illustrates an arrangement for conducting electronic transaction with virtual POS terminal of the present disclosure, in accordance with various other example embodiments.

FIG. 4 shows an arrangement 400 in which a POS transaction may be processed using the virtual POS terminal of the present disclosure, in accordance with various other example embodiments. As shown in FIG. 4, arrangement 400 may include computing device 105A, merchant domain 130, payment acquiring service 145, messaging service 160, network 150, and cloud trusted execution environment 415. Additionally, computing device 105A may include POS UI module 110, and the cloud trusted execution environment 415 may include the virtual POS terminal 120 and payment credential DB 125. Furthermore, the merchant domain may include a cloud POS service 135 and the merchant server 140 (also referred to as "merchant 140").

The cloud POS service 135, the merchant server 140, payment acquiring service 145, messaging service 160, and the network 150 as shown in FIG. 4 may be the same or similar to the cloud POS service 135, the merchant server 140, payment acquiring service 145, messaging service 160, and the network 150 as shown in FIG. 1. Additionally, the POS UI 110, the virtual POS terminal 120, and the payment credential DB 125 of arrangement 400 may operate in a same or similar fashion as the POS UI 110, the virtual POS terminal 120, and the payment credential DB 125 of arrangement 100. In contrast to computing device 105 of FIG. 1, as shown in FIG. 4, the computing device 105A does not include a trusted execution environment 115, but instead, the trusted execution environment 115 is replaced with the cloud trusted execution environment 415.

The cloud trusted execution environment 415 may be one or more hardware computing devices that may include one or more servers or other like network elements for providing one or more services. The one or more services provided by the cloud trusted execution environment 415 may include processing POS transactions on behalf of the computing device 105. In this regard, cloud trusted execution environment 415 may communicate data (i.e., transmit and receive) with POS UI module 110 located in the computing device 105A via network 150. In order to communicate with the POS UI module 110, the cloud trusted execution environment 415 may generate POS transaction messages (which may be communicated to the POS UI module 110) in accordance with ISO 8583 and/or any other like standards for encrypting and/or encapsulating data for exchanging electronic transactions made by cardholders using payment cards. In such embodiments, the POS UI 110 of the computing device 105A may also communicate with the cloud trusted execution environment 415 via network 150. The communications between the computing device 105A and cloud trusted execution environment 415 may be carried out in a same or similar fashion as the communications between the POS UI 110 and the virtual POS terminal 120 as discussed previously with regard to FIGS. 1-3. However, in the arrangement 400 the communications between the POS UI 110 and the virtual POS terminal 120 may additionally include encrypting and/or enciphering the POS transaction messages according to one or more encryption or enciphering algorithms discussed herein prior to communicating such messages over the network 150.

Figure 5:
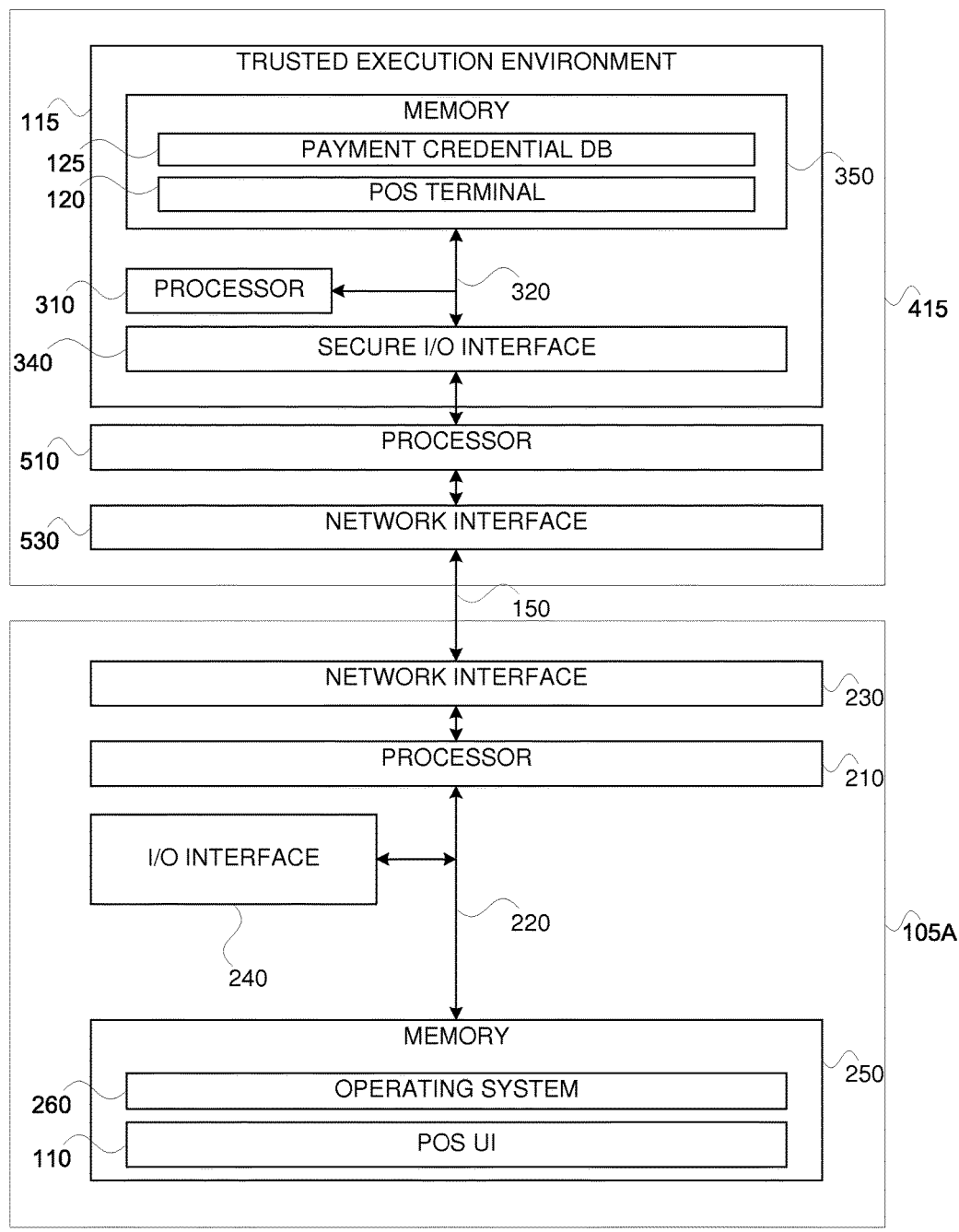
FIG. 5 illustrates the components of another example computing device and a cloud trusted execution environment with the virtual POS terminal, in accordance with various other example embodiments.

FIG. 5 illustrates the components of example computing device 105A and cloud trusted execution environment 415 with the virtual POS terminal 120, in accordance with various example embodiments. As shown, computing device 105A may include processor 210, bus 220, network interface 230, input/output (I/O) interface 240, and memory 250. As shown, cloud trusted execution environment 415 may include a processor 510, a network interface 530, and the trusted execution environment 115. The trusted execution environment may include memory 350 and processor 310. In some embodiments, computing device 105A and/or cloud trusted execution environment 415 may include many more components than those shown in FIG. 5, such as a display device (e.g., a computer monitor, a touchscreen, etc.), one or more input devices (e.g., a physical keyboard, a touch screen, etc.), one or more image sensors, a transmitter/receiver (or alternatively, a transceiver), a mobile video card and/or graphics processing unit (GPU), and other like components.

The processor 210, the bus 220, the network interface 230, the I/O interface 240, and the memory 250 of the computing device 105A may be the same or similar as the processor 210, the bus 220, the network interface 230, the I/O interface 240, and the memory 250 of the computing device 10 discussed previously with regard to FIGS. 2-3. Additionally, the trusted execution environment 115, the memory 350, the processor 310, the bus 320 and the secure I/O interface 340 of the cloud trusted execution environment 415 may be the same or similar to the trusted execution environment 115, the memory 350, the processor 310, the bus 320 and the secure I/O interface 340 of computing device 105 as discussed previously with regard to FIG. 2. Furthermore, the processor 510 may be a same or similar device that operates in a same or similar fashion as the processor 210, and the network interface 530 may be a same or similar device that operates in a same or similar fashion as the network interface 230.

In contrast to computing device 105 discussed with regard to FIGS. 1-3, as shown in FIG. 5, the POS UI 110 of computing device 105A may access the virtual POS terminal 120 via the network 150 using the network interface 230 to communicate POS transaction messages to the cloud trusted execution environment 415. The network interface 530 may receive the communicated POS transaction messages and provide the POS transaction messages in their encrypted form to the processor 510, which may then route the POS transaction messages to the secure I/O interface 340 in a same or similar fashion as discussed previously with regard to FIG. 2. The cloud trusted execution environment 415 may also communicate POS transaction messages to the computing device 105A via the network 150 by using the network interface 530.

Furthermore, although not shown, in various embodiments, the cloud trusted execution environment 415 may have a component configuration that is similar to the configuration shown by FIG. 3. In such embodiments, computing device 105A may still include similar components as shown by FIGS. 2 and 5, such as processor 210, bus 220, network interface 230, input/output (I/O) interface 240, and memory 250, each of which may operate in a same or similar manner as discussed with regard to FIG. 2. Additionally, in such embodiments, the trusted execution environment 115 may be within a memory device of the cloud trusted execution environment 415 (not shown) and may operate in a same or similar fashion as discussed with regard to FIG. 3, such as the trusted execution environment 115 of the cloud trusted execution environment 415 including one or more secure enclaves defined using the Intel® SGX.

Figure 6:
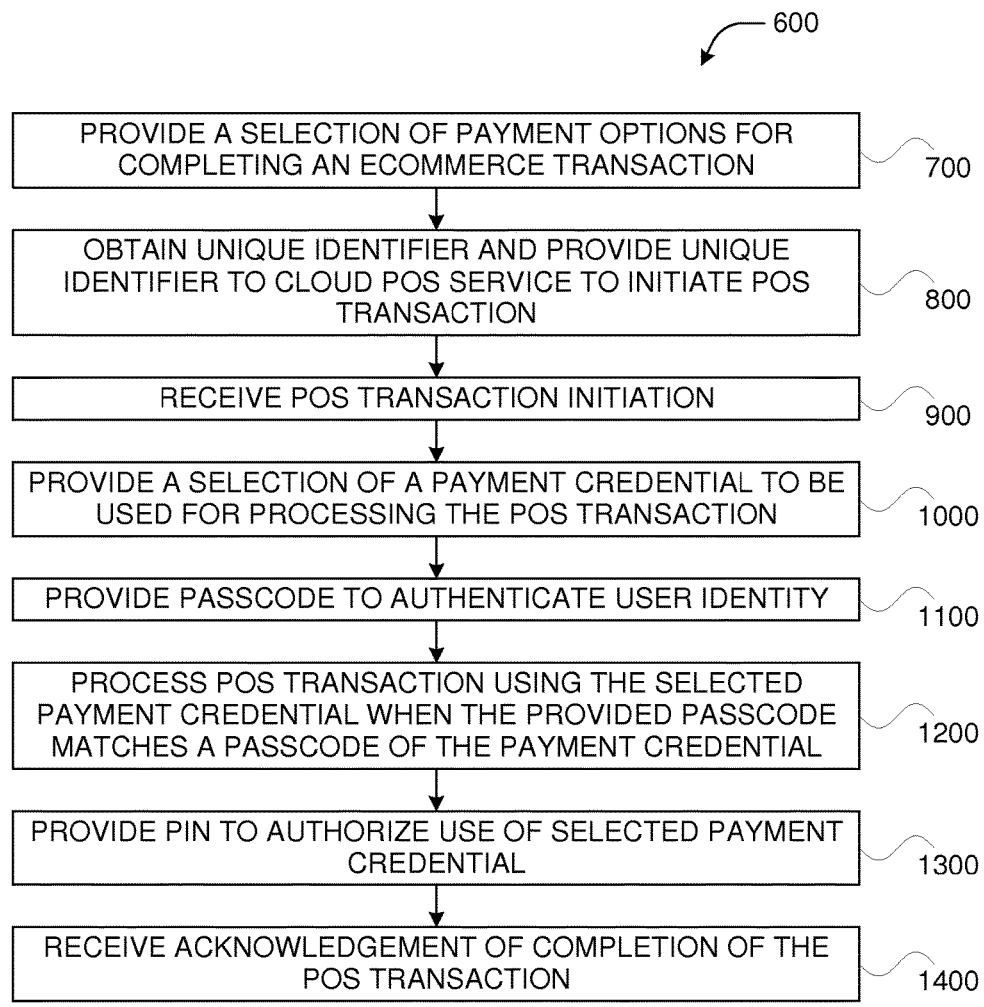
FIG. 6 illustrates a method of processing a POS transaction using the virtual POS terminal, in accordance with various example embodiments.

FIG. 6 illustrates a method 400 for processing a POS transaction, in accordance with various example embodiments. FIGS. 7-14 illustrate various user interface stages, each of which corresponds to an operation of method 600 of FIG. 6 having a same numeral. In particular, each of FIGS. 7-14 illustrate an example user interface that may be displayed on a display device of computing device 105 as each operation of method 600 is performed using computing device 105. However, it should be noted that the process 600 may be performed by computing device 105A, wherein the example user interfaces may be displayed on a display device of computing device 105A as each operation of method 600 is performed using computing device 105A. While particular examples and orders of operations are illustrated in FIGS. 6-14, in various embodiments, these operations may be re-ordered, broken into additional operations, combined, and/or omitted altogether. Furthermore, the user interfaces illustrated by FIGS. 7-14 may be generated or otherwise formed in various artistic representations without departing from the example embodiments disclosed herein.

Figure 7:
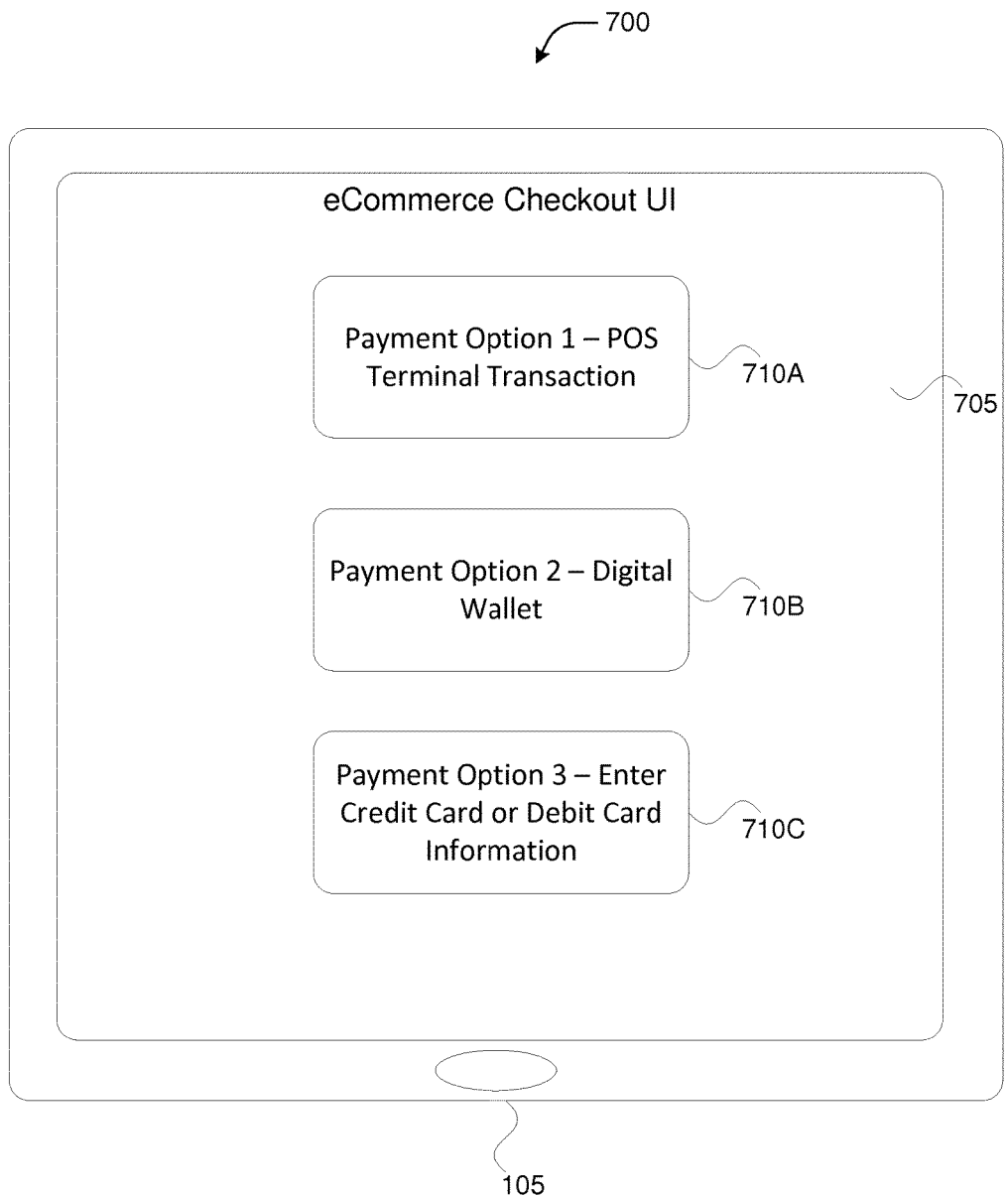
FIGS. 7-14 illustrate stages of performing the method of FIG. 4.

Referring to FIG. 6, at operation 700 the computing device 105 may provide a selection of payment options for completing a POS transaction. Referring to FIG. 7, the computing device 105 may display a screen 505 that includes three payment option buttons 710A-C. In various embodiments, the screen 505 may be displayed during an ecommerce checkout process for purchasing products and/or services from an online store or a merchant website (e.g., a website associated with merchant 140). As shown by FIG. 7, the computing device 105 may be a mobile device including a touchscreen display device, wherein a user may provide an input to the computing device 105 by performing one or more gestures on the touchscreen display device using a finger, a stylus, etc. The payment option buttons 710A-C may be graphical control elements that may be used to provide a selection of one of a plurality of payment options. In such embodiments, the user may press one of the payment option buttons 710A-C to select a desired payment option. When a user of computing device 105 selects a desired payment option (e.g., payment option 1 710A), the computing device 105 may activate the POS UI module 110 so that the user may access the virtual POS terminal 120 to complete the POS transaction.

Figure 8:
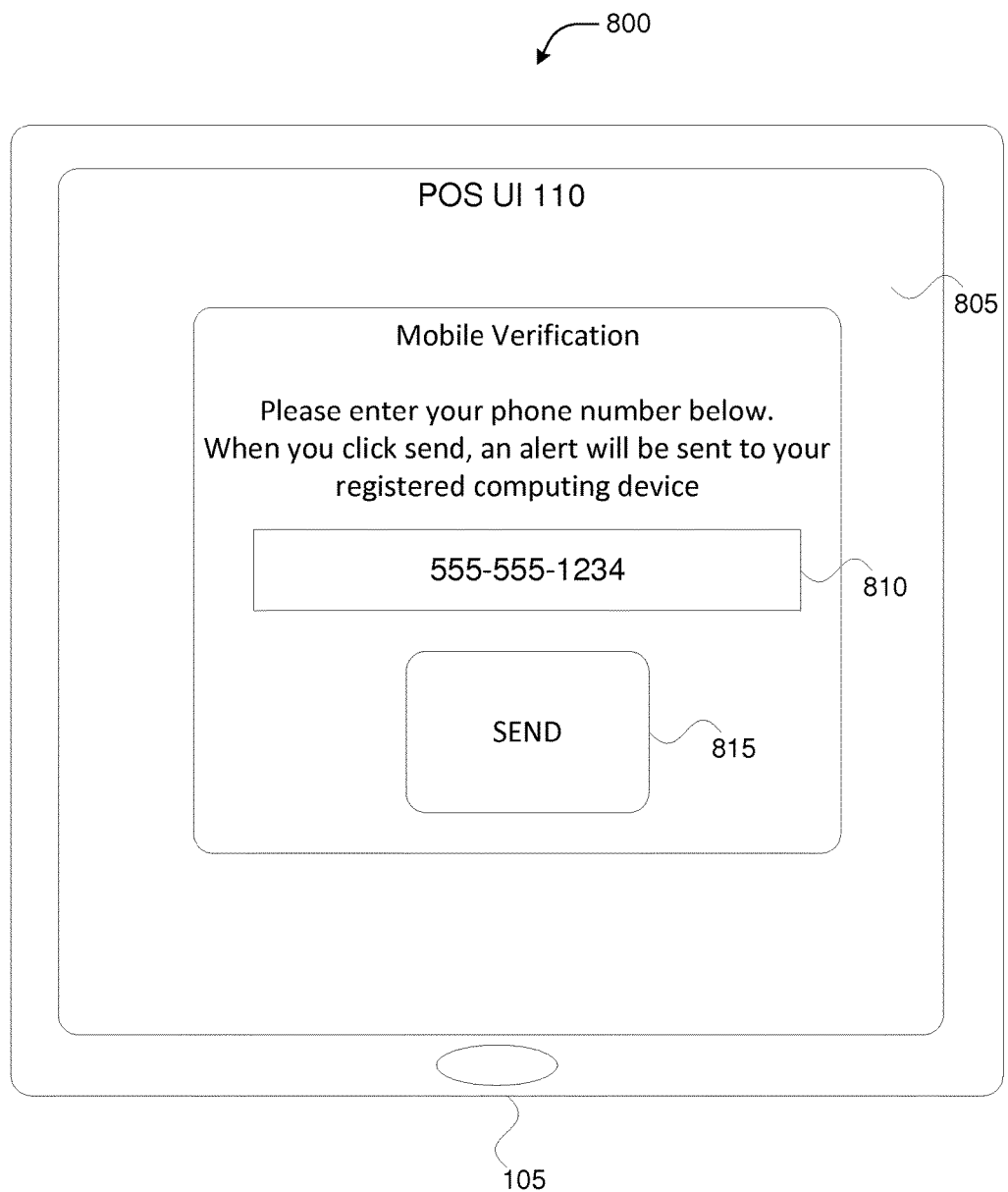

Referring back to FIG. 6, at operation 800 the computing device 105 may obtain a unique identifier associated with the computing device 105 and provide the unique identifier to initiate the POS transaction. Referring to FIG. 8, when the POS UI module 110 is activated, the POS UI module 110 may display a screen 605 that allows a user to enter or input a unique identifier associated with the computing device 105. In embodiments where the computing device 105 includes a touchscreen display device, the screen 805 may include a keypad that may be overlaid on top of the POS UI module 110 (not shown) so as to enable the user of the computing device to enter the unique identifier into the text box 810. Text box 810 may be any type of graphical control element that enables a user of the computing device 105 to input text information to be used for initiating a POS transaction. The send button 815 may be a graphical control element that may operate in a same or similar fashion as the payment option buttons 710A-C, which may be used to submit the unique identifier to the cloud POS service 135.

In the embodiment shown by FIG. 8, the unique identifier may be a phone number associated with the computing device 105. As shown, a user of the computing device 105 may input the phone number into text box 810, and when the user selects the send button 815, the POS UI module 110 may provide the phone number to the cloud POS service 135 to initiate the POS transaction. It should be noted that in some embodiments, the unique identifier may be an email address, a media access control (MAC) address, a domain name, an IP address, and/or any other like unique identifier.

Figure 9:
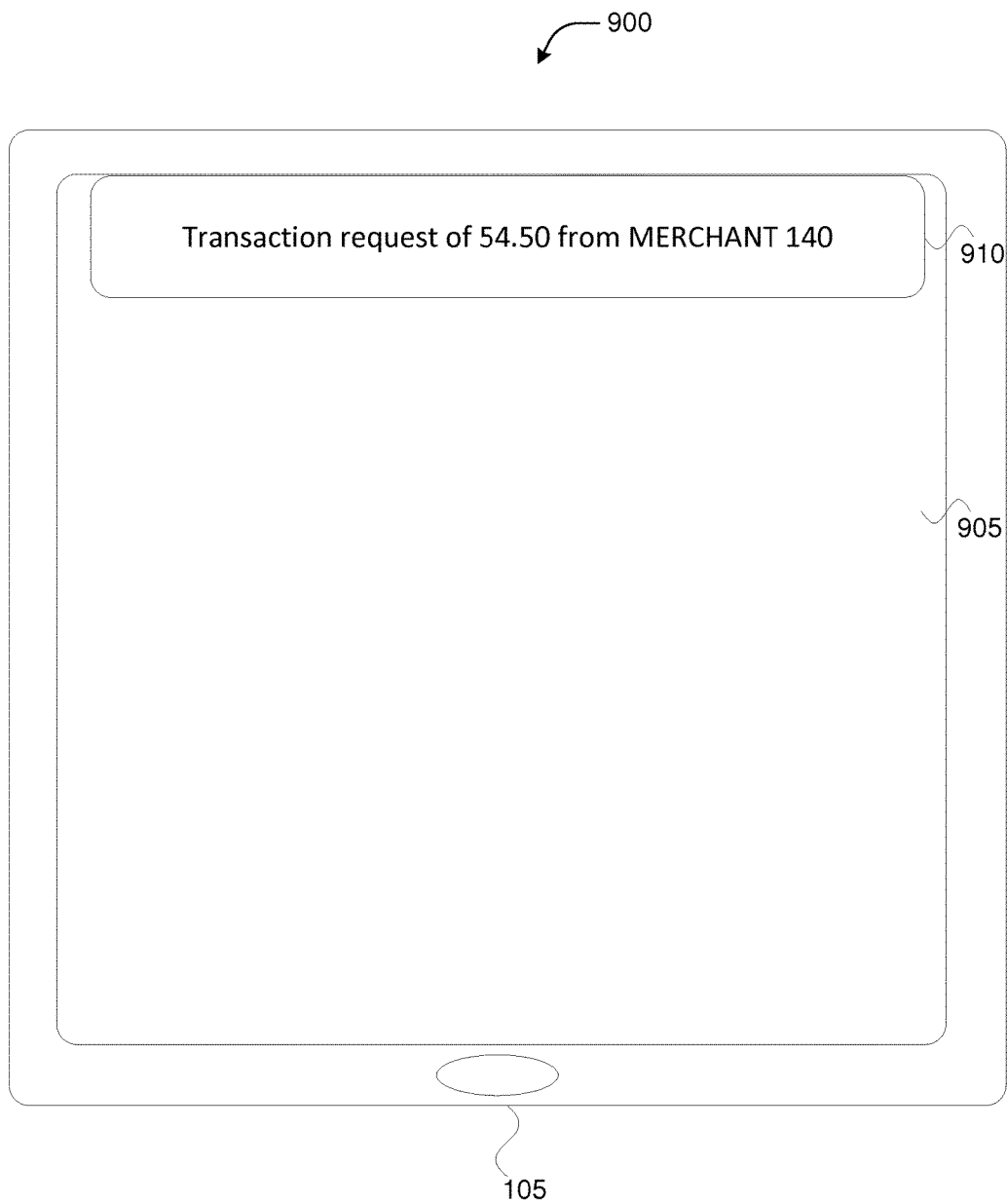

Referring back to FIG. 6, at operation 900, the POS UI module 110 of the computing device 105 may receive a transaction initiation from the cloud POS service 135. Referring to FIG. 9, when the computing device 105 receives the transaction initiation, the POS UI module 110 may display screen 905, which includes message 910 that indicates that the computing device 105 has received a POS transaction initiation. In embodiments where the unique identifier is a phone number associated with the computing device 105, the transaction initiation may be received via a text message. In such embodiments, the text message may be a short message service (SMS) message, a multimedia messaging service (MMS) message, or any other type of message that based in cellular network technology. It should be noted that in embodiments where the unique identifier is a MAC address or an IP address, the message 910 may be a push notification sent by a messaging service (e.g., messaging service 160), a notification in response to a client pull communication, and/or the like. In various embodiments, the message 910 may be a graphical control element that allows a user of the computing device 105 to initiate processing the POS transaction indicated by the message 910. For example, when the user selects the message 910, the POS UI module 110 may provide a user interface that allows the user to select one or more payment credentials to be used for processing the POS transaction.

Figure 10:
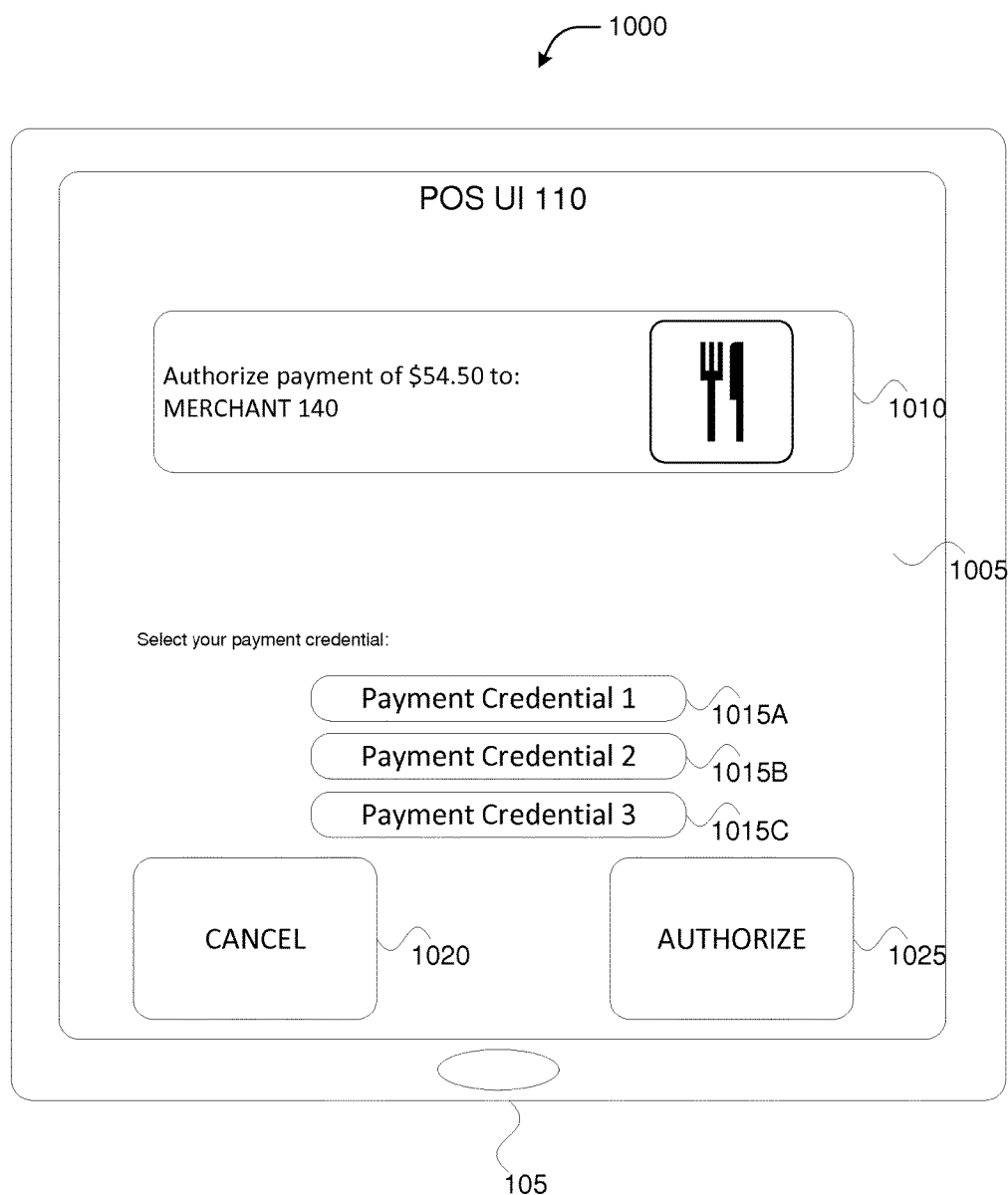

Referring back to FIG. 6, at operation 1000, the POS UI module 110 of the computing device 105 may provide a selection of a payment credential to be used for processing the POS transaction. Referring to FIG. 10, the POS UI module 110 may display screen 1005, which includes message 1010, payment credential buttons 1015A-C, cancel button 1020, and authorize button 1025.

In the embodiment shown by FIG. 10, the message 1010 may indicate a POS transaction amount (e.g., $54.50) and a merchant payee (e.g., merchant 140). The message 1010 may also include a trademark, symbol, emblem, or other like identifying image associated with the merchant payee. In some embodiments the message 1010 may include the same or similar information as message 910.

The payment credential buttons 1015A-C may be graphical control elements that may operate in a same or similar fashion as buttons 710A-C and 815. The payment credential buttons 1015A-C may allow a user of the computing device 105 to select a desired payment credential stored in the payment credential DB 125. Each of the payment credentials represented by payment credential buttons 1015A-C may include payment information that may be accepted by a merchant payee. In most embodiments, each of the payment credentials may be associated with a physical credit card, a charge card, a debit card, a prepaid card, a gift card, an automated teller machine (ATM) card, an EBT card, a stored-value card, a fleet card, an electronic check, digital currency wallet, and/or other like physical payment credentials. In such embodiments, each payment credential may include payment information, such as card number, expiration date, card verification code (CVC) code, digital currency public-private key pairs, cardholder name, billing address, security questions and answers, and the like. In some embodiments, each payment credential may be associated with an electronic form of payment, without a physical counterpart, such as an electronic script or any other type of substitute for legal tender. In such embodiments, the payment credentials may include the same or similar information as discussed previously with regard to physical payment cards. Additionally, each payment credential may also include additional information that is required or desired to complete a POS transaction, such as authentication terms and/or transaction terms required by a payment credential, a merchant authentication challenge, a cryptographic client certificate that is unique to a payment credential, and/or other like POS transaction-related data.

Furthermore, FIG. 10 shows three payment credential buttons 1015A-C, each of which is associated with a different payment credential. However, according to various embodiments, the number of payment credential buttons that are displayed in screen 805 may vary according to the number and types of payment credentials accepted by the merchant 140 and/or the number and types of payment credentials that are stored in the payment credential DB 125. Therefore, many more (or fewer) payment credentials may be displayed in screen 805. For example, the merchant 140 may only accept payment credentials associated with payment credential buttons 1015A-C even though the payment credential DB 125 stores many more payment credentials. By way of another example, the payment credential DB 125 may only include the payment credentials associated with payment credential buttons 1015A-C, even though the merchant 140 may accept many more payment credentials. Additionally, in some embodiments, the POS transaction initiation may indicate a geographic location of the merchant 140, and the POS UI module 110 may obtain payment credentials from within the payment credential DB 125 that may be accepted within a jurisdiction or other like venue containing the geographic location of the merchant 140. By way of example, the payment credential DB 125 may include payment credentials that may be accepted in the United States and payment credentials that may be accepted in France, and if the merchant 140 is located within the United States, the payment credential buttons 1015A-C may be associated with payment credentials that are issued by issuing banks located within the United States or otherwise accepted by merchants located within the United States, even though the computing device 105 may be located within France. In various embodiments, the POS transaction initiation may indicate the types of payment credentials accepted by the merchant 140, and the POS UI module 110 may generate screen 1005 to include a number of payment credential buttons 1015 based on a query of the payment credential DB 125 using the information contained in the POS transaction initiation. In some embodiments, the POS UI module 110 may submit the query to the virtual POS terminal 120, which may conduct the actual search through the payment credential DB 125, while in other embodiments the POS UI module 110 may search through the payment credential DB module 110 independent of the virtual POS terminal 120. For example, the POS UI module 110 may submit the query through a secure I/O interface 340 (see e.g., the example embodiments described with regard to FIGS. 2 and 5) or may issue one or more SGX commands to query the payment credential DB 125 (see e.g., the example embodiments described with regard to FIGS. 3 and 5).

Once the user of the computing device 105 selects one of the payment credentials to be used for processing the POS transaction, such by pressing the payment credential button 1015A to select payment credential 1, the user may then select the authorize button 1025 to initiate the virtual POS terminal 120 to process the POS transaction using the selected payment credential 1, or the user of the computing device 105 may select the cancel button 1020 to cancel the POS transaction.

Figure 11:
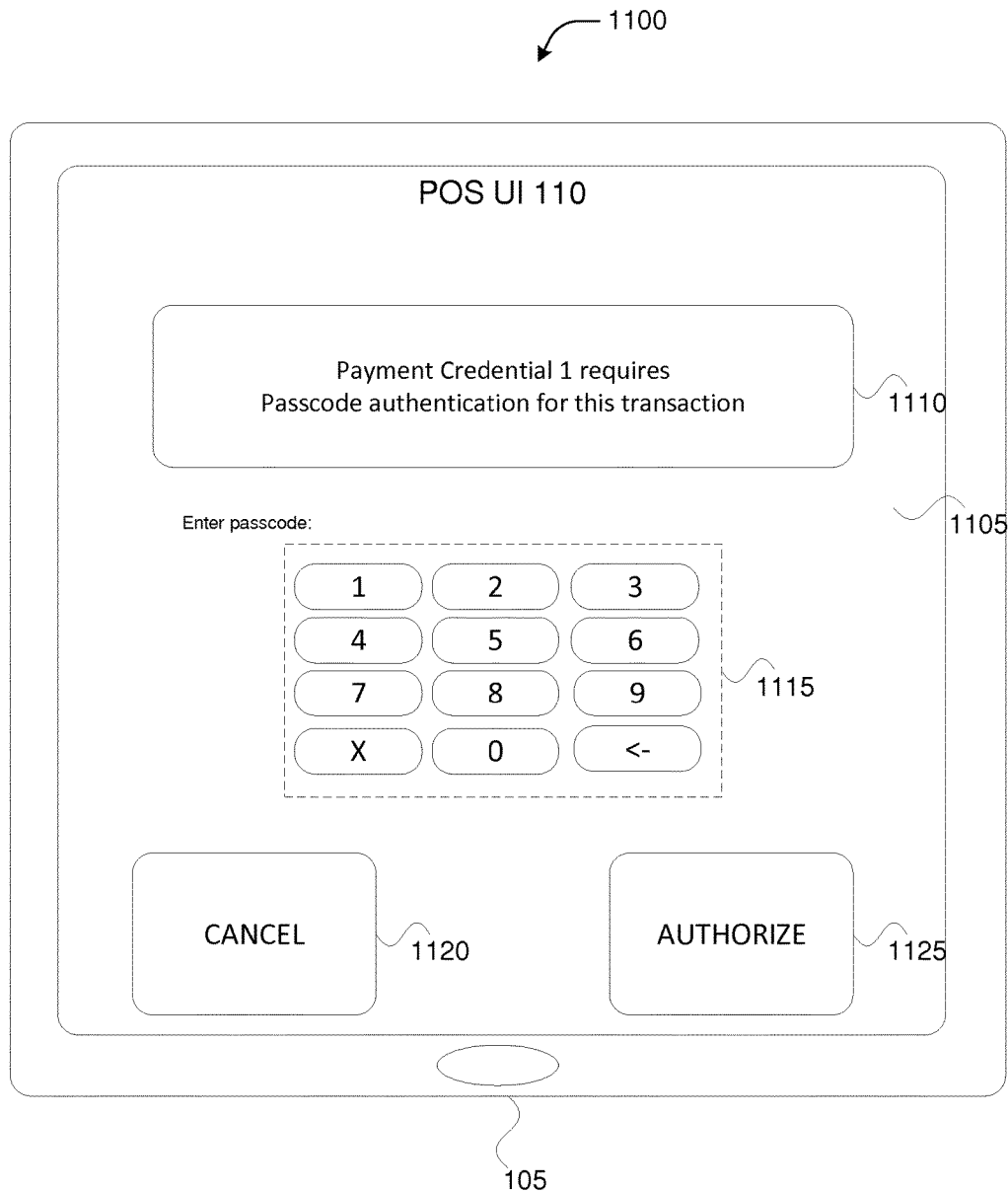

Referring back to FIG. 6, at operation 1100, the POS UI module 110 of the computing device 105 may provide a passcode to authorize use of the selected payment credential. Referring to FIG. 11, the screen 1105 may include message 1110, keypad 1115, cancel button 1120, and authorize button 1125, which may operate in a same or similar manner as message 1010, keypad 1015, cancel button 1020, and submit button 1025 of FIG. 10, respectively. In various embodiments, each of the payment credentials 1015A-C may require a passcode, password, or other like string of numerals or string of characters to authenticate or otherwise prove an identity of the user of the computing device 105. As will become apparent later, the passcode used at operation 1100 may be different than a personal identification number (PIN) used to authorize use of a payment credential. In some embodiments, the passcode may be specific to each payment credential, while in other embodiments, the passcode may be a same passcode used to access the computing device 105, such as from a lockscreen or login screen of the computing device 105. Accordingly, in various embodiments, the payment credential DB 125 may store a passcode in association with each payment credential.

The keypad 1115 may include a set of buttons or other like graphical control elements arranged in a block or pad that bear a digit, symbol, or character that enables the user of the computing device 105 to enter the passcode. Each of the graphical control elements within the keypad 915 may operate in a same or similar manner as discussed with regard to buttons 710A-C, 815, 1015A-C, 1020, 1025, etc. As shown by FIG. 11, the computing device 105 may be a mobile device including a touchscreen display device, wherein the user may press one or more of the graphical control elements of the keypad 1115 using a finger or stylus to enter or input a passcode. In some embodiments where the computing device 105 includes a touchscreen display device, a gesture-based passcode may be used instead of using keypad 1115 to enter a numeric-based and/or character-based passcode. In such embodiments, a user may be required to perform one or more touch-gestures in a predetermined sequence to authenticate or otherwise prove an identity of the user. In embodiments where the computing device 105 does not include a touchscreen display device, the passcode may be entered using a physical keyboard or using mouse point-and-click actions. Once the user of the computing device 105 inputs a passcode using the keypad 1115, the user may then select the authorize button 1125 to submit the passcode to the virtual POS terminal 120 to continue processing the POS transaction using the selected one of the payment credentials 1015A-C. Additionally, the user of the computing device 105 may select the cancel button 1120 to cancel the POS transaction. In various embodiments, the POS UI 110 may be operate in conjunction with the Protected Transaction Display (PTD) provided by Intel®, such that the screen 1105 is generated by an application running within the trusted execution environment 115 or otherwise outside of the operating system 260. In such embodiments, the PTD may provide a graphics overlay and randomly placed input options (e.g., buttons of keypad 1115), which may protect the selected inputs from malware scraping and/or other like malicious attempts to obtain payment credential-related information. Furthermore, it should be noted that in various embodiments, instead of requiring a passcode to be entered by a user of computing device 105, at operation 1100, biometric information (e.g., user voice recognition, facial recognition, eye scan, fingerprint, etc.) may be used as an authenticating factor for proving an identity of the user of the computing device 105. In such embodiments, instead of providing the keypad 1115, the computing device 105 may execute an application that utilizes one or more biometric sensors, or other like sensors to obtain the biometric information.

Referring back to FIG. 6, at operation 1200, the virtual POS terminal 120 of the computing device 105 may begin processing the POS transaction using the selected payment credential when the provided passcode matches a passcode associated with the payment credential. In various embodiments, the POS UI module 110 may provide the input passcode from operation 1100 to the virtual POS terminal 120, wherein the virtual POS terminal 120 compares the input passcode with a passcode associated with the selected payment credential. If the input passcode matches the passcode associated with the selected payment credential, the virtual POS terminal 120 may provide the POS UI module 110 with various POS transaction-related data associated with the selected payment credential to be communicated with the cloud POS service 135. In such embodiments, while the computing device 105 is communicating with the cloud POS service 135, the POS UI module 110 may display screen 1205 to indicate to a user of the computing device 105 that the POS transaction is being processed. Message 1210 may indicate one or more operations that the computing device 105 is undertaking to process the POS transaction. Accordingly, in various embodiments, the message 1210 may display information based on the operations that the computing device 105 is performing. As shown, the screen 1205 may include progress image 1215, which may be a graphical control element used to visualize a progression of one or more computer operations. In some embodiments, the progress image 1215 may include a progress bar, a textual representation of the progress in a percent format, a throbber, and/or other like an animated graphical control element that visualizes that one or more computer operations are being performed.

Figure 12:
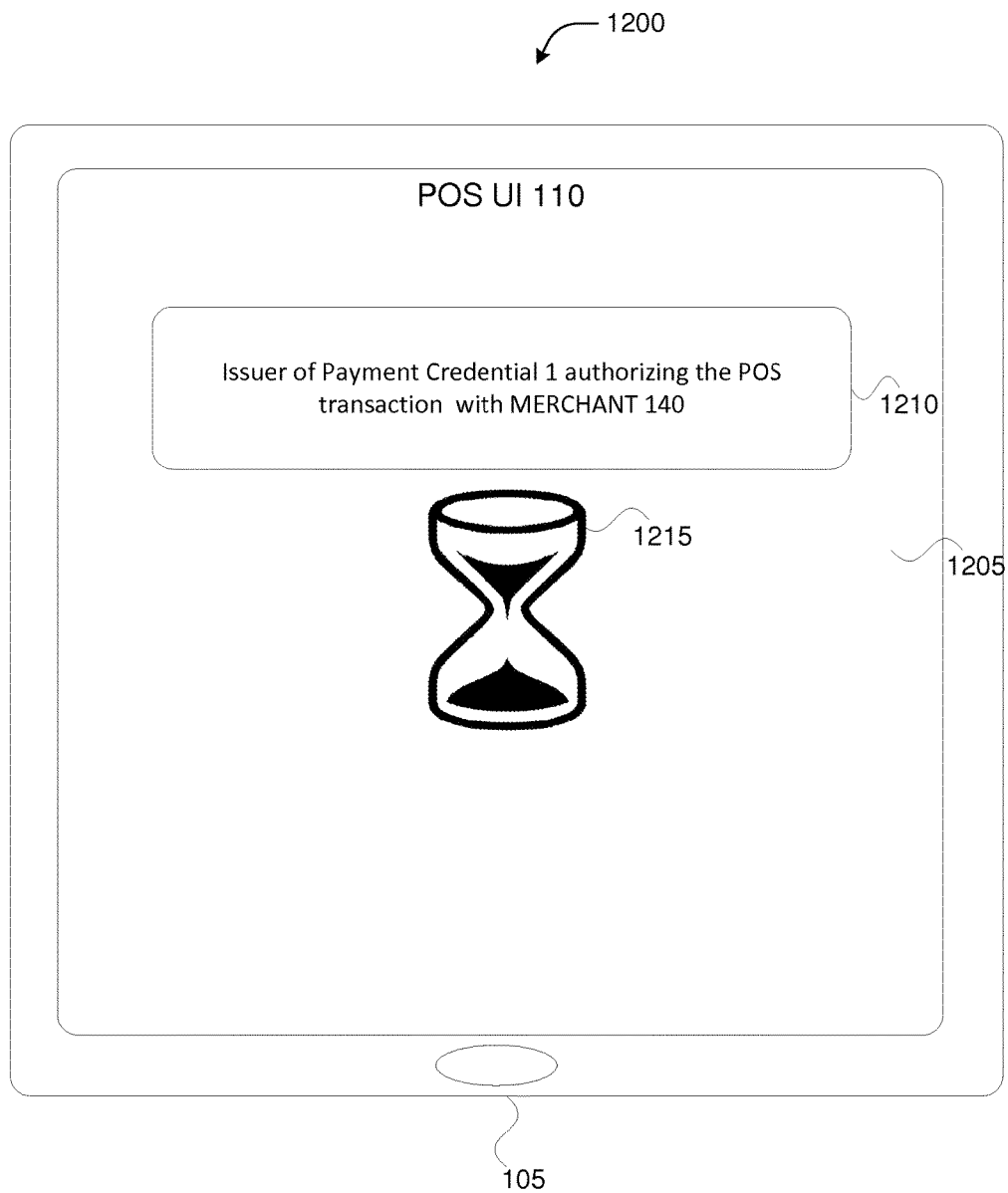
Figure 13:
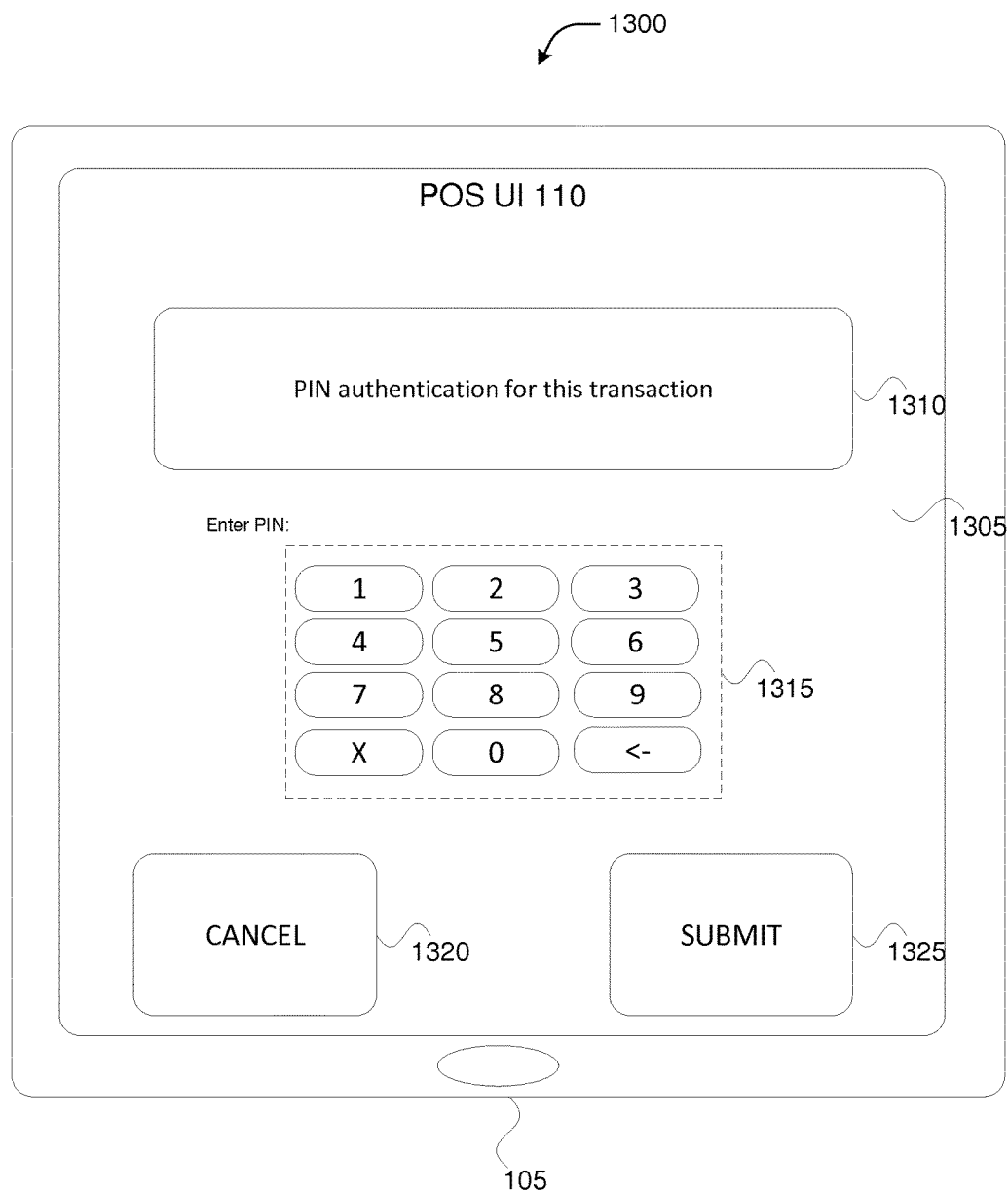

Referring back to FIG. 6, at operation module 1300, the POS UI module 110 of the computing device 105 may provide a PIN to authorize use of the selected payment credential. Referring to FIG. 13, the screen 1305 may include message 1310, keypad 1315, cancel button 1320, and submit button 1325, which may operate in a same or similar manner as message 1010, keypad 1015, cancel button 1020, and submit button 1025 of FIG. 10, respectively. In various embodiments, the PIN may be a numeric password that may be used to indicate whether the user of the computing device 105 is authorized to use the selected payment credential. In various embodiments, the PIN that is input at operation module 1300 may be used to authenticate the user with the cloud POS service 135 and/or the virtual POS terminal 120, whereas the passcode discussed with regard to operation 1000 may be used to access the payment credential located within the trusted execution environment 115. It should be noted that, in some embodiments, the requirement to enter a PIN may be dependent on the purchase price, merchant requirements and/or payment credential requirements. For example, some payment credentials or merchants may not require a user to enter a PIN when a purchase price is under a threshold amount or when the purchase price is not above a threshold amount. Once the user of the computing device 105 inputs a PIN using the keypad 1315, the user may then select the authorize button 1325 to submit the PIN to the cloud POS service 135 to continue processing the POS transaction using the selected payment credential. Additionally, the user of the computing device 105 may select the cancel button 1320 to cancel the POS transaction. Furthermore, in various embodiments, after operation module 1100 the POS UI module 110 may display screen 1205 as shown by FIG. 12 to indicate to the user of the computing device 105 that the POS transaction is currently being processed.

In various embodiments, the POS UI 110 may be operate in conjunction with the PTD provided by Intel®, such that the screen 1105 is generated by an application running within the trusted execution environment 115 or otherwise outside of the operating system 260. In such embodiments, the PTD may provide a graphics overlay and randomly placed input options (e.g., buttons of keypad 1115), which may protect the selected inputs from malware scraping and/or other like malicious attempts to obtain payment credential-related information. Furthermore, it should be noted that in various embodiments, instead of requiring a PIN to be entered by a user of computing device 105, at operation 1300, biometric information (e.g., user voice recognition, facial recognition, eye scan, fingerprint, etc.) may be used as an authenticating factor for authorizing use of the selected payment credential. In such embodiments, instead of providing the keypad 1315, the computing device 105 may execute an application that utilizes one or more biometric sensors, or other like sensors to obtain the biometric information.

Referring back to FIG. 6, at operation 1400, the POS UI module 110 of the computing device 105 may receive acknowledgment of completion of the POS transaction.

Figure 14:
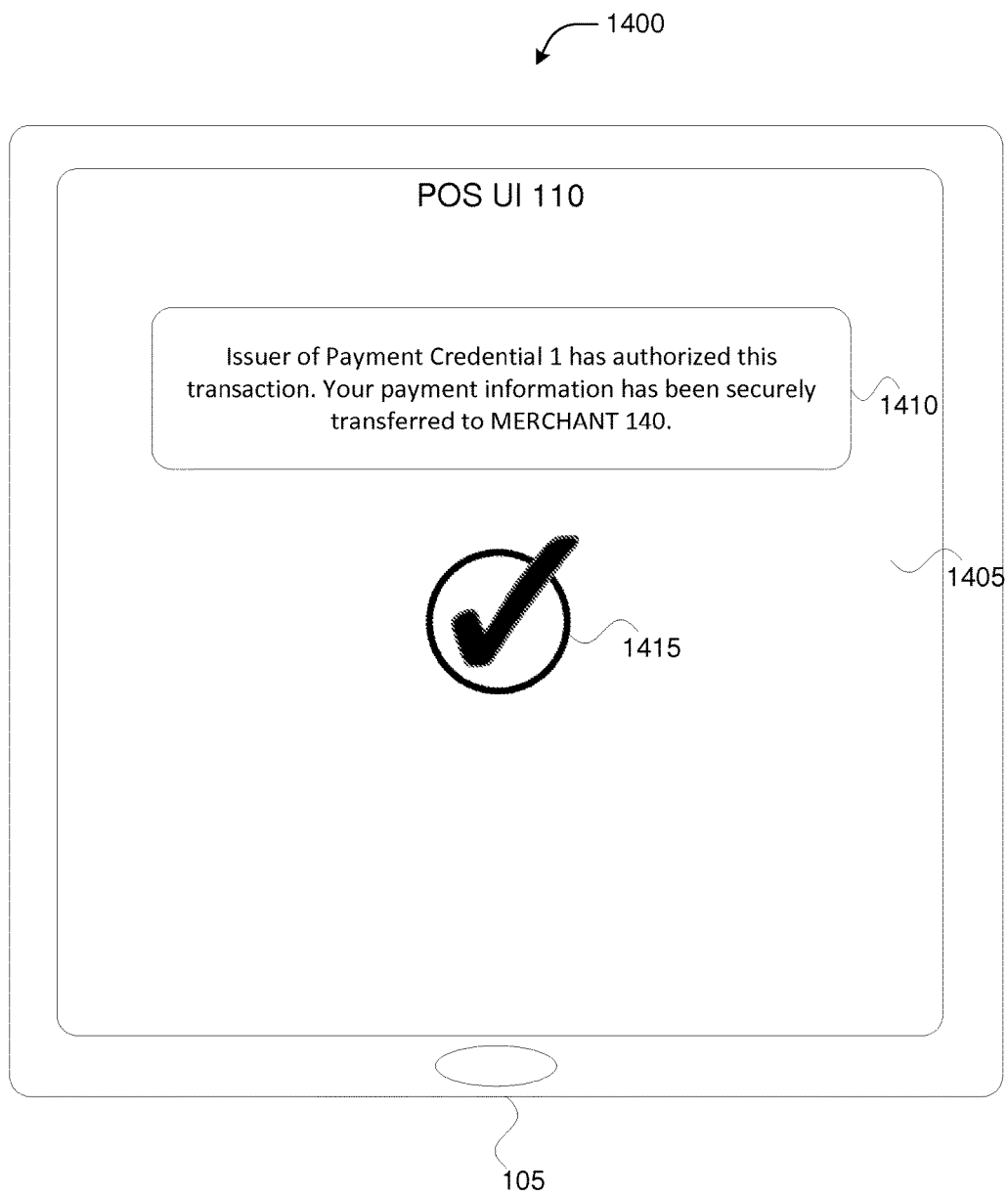

Referring to FIG. 14, the POS UI module 110 may display screen 1405, which includes message 1410 and image 1415. The message 1410 and the image 1415 may indicate that the POS transaction was successful (as shown), or may indicate that the POS transaction was unsuccessful (not shown).

Figure 15:
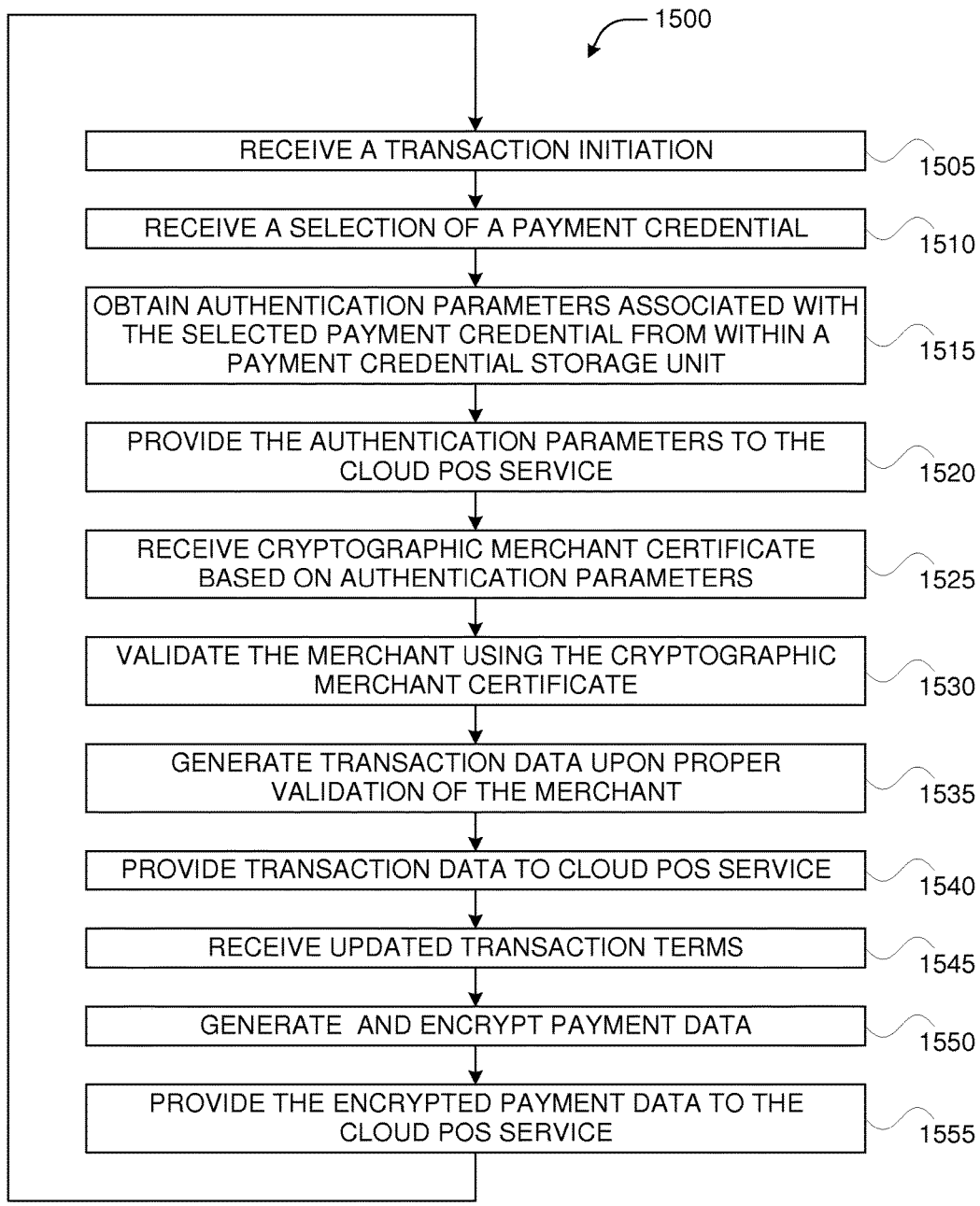
FIG. 15 illustrates an example process for processing a POS transaction using the virtual POS terminal, in accordance with various embodiments.

FIG. 15 is a flowchart illustrating an example process 1500 of processing a POS transaction, in accordance with various embodiments. For illustrative purposes, the operations of process 1300 will be described as being performed by the computing device 105 utilizing the various modules, as described with respect to FIGS. 1-. However, it should be noted that other similar devices, such as computing device 105A as discussed with regard to FIGS. 4-5, may operate the process 1500 as described below. While particular examples and orders of operations are illustrated in FIG. 15, in various embodiments, these operations may be re-ordered, broken into additional operations, combined, and/or omitted altogether.

Referring to FIG. 15, at operation 1505, the virtual POS terminal 120 may receive, via the POS UI module 110, a transaction initiation from a cloud POS service 135, messaging service 160, or other device within the merchant domain 130. In various embodiments, the transaction initiation may be a SMS message, a MMS message, an email message (or a file attached or otherwise included in an email message), a push notification, and/or any other like message that may be received by the computing device 105 over a wired or wireless network connection.

At operation 1510, the virtual POS terminal 120 may receive a selection of a payment credential from the POS UI module 110. The selection of the payment credential may obtained by the POS UI module 110 in a same or similar fashion as discussed with regard to FIGS. 6 and 10. At operation 1515, the virtual POS terminal 120 may obtain authentication parameters associated with the selected payment credential from within the payment credential DB 125. According to various embodiments, the virtual POS terminal 120 may obtain the authentication parameters by querying the payment credential DB 125 according to known database querying methods. At operation 1520, the virtual POS terminal 120 may provide, via the POS UI module 110, authentication parameters associated with the selected payment credential to the cloud POS service 135 or other device within the merchant domain 130. In various embodiments, the authentication parameters may be security measures, defined by the selected payment credential, required for authenticating entities and/or communicating data between entities.

At operation 1525, the virtual POS terminal 120 may receive from the cloud POS service 135, via the POS UI module 110, a cryptographic merchant certificate based on the authentication parameters. The cryptographic merchant certificate may be a public key certificate, digital certificate, identity certificate, etc. that is unique to the merchant 140, which may be used to prove that the merchant 140 owns or otherwise possesses a public key. The cryptographic merchant certificate may include information indicating the identity of the merchant 140, such as an IP address and/or domain name of the merchant 140, a serial number that is unique to the cryptographic merchant certificate, a digital signature used to verify that the cryptographic merchant certificate originated from the merchant 140, a signature algorithm used to create the digital signature, an issuer identifier such as an IP address and/or domain name, generation date, expiration date, key-usage information, a public key, an algorithm used to hash the public key (also referred to as a "thumbprint algorithm"), a hashed public key (also referred to as a "thumbprint"), and/or any other like information. In various embodiments, the cryptographic merchant certificate may be generated and issued to the merchant 140 by a certificate authority in accordance with EMV standards 4.3 and/or other like standards. However, in various embodiments, the authentication parameters may define one or more criteria required by the selected payment credential to verify the identity of the merchant 140. Thus, in various embodiments, the cryptographic merchant certificate may be altered to fulfill one or more of the authentication parameters, or may include additional information required by the authentication parameters to validate the identity of the merchant 140.

At operation 1530, the virtual POS terminal 120 may validate the merchant 140 identity using the cryptographic merchant certificate. The virtual POS terminal 120 may validate the merchant identity according to known methods, such as by using a public key contained in the cryptographic merchant certificate, obtaining a public key associated with the merchant 140 from a certificate authority (either directly or via the cloud POS service 135), validating the public key signature from the cryptographic merchant certificate with the public key retrieved from the certificate authority, confirming the IP address and/or domain name of the merchant 140 listing in the cryptographic merchant certificate, generating a shared symmetric key to be used to encrypt POS transaction data, encrypting the symmetric key with the public key, and sending the encrypted symmetric key and public key back to ensure that only the cloud POS service 135 can decrypt the encrypted symmetric key and public key using a private key. In some embodiments, the virtual POS terminal 120 may validate a digital signature included with the cryptographic merchant certificate according to known methods, which may include obtaining a session key, obtaining a private key associated with the merchant 140, decrypting the session key using the private key, obtaining an encrypted hash value associated with the merchant 140, obtaining a public key associated with the merchant 140, decrypting the encrypted hash value using the public key, comparing the decrypted hash value with the calculated hash value, and validating the identity of the merchant 140 if the decrypted hash value matches the calculated hash value. It should be noted that the merchant 140 identity may be validated using one or more other known methods in addition to, or alternative to the aforementioned methods.

At operation 1535, the virtual POS terminal 120 may generate transaction data upon properly validating the merchant 140. In various embodiments, the transaction data may include transaction terms required by the selected payment credential, a cryptographic client certificate, and an authentication challenge. The transaction terms may include authorization information required by the selected payment credential to authorize payment for the POS transaction. For example, authorization information may indicate whether the user of the computing device 105 is required to enter a PIN, and in some embodiments, the requirement to enter a PIN may be dependent on the purchase price or other like criteria. For example, some payment credentials may not require a user to enter a PIN when a purchase price is under a threshold amount or when the purchase price is not above a threshold amount.

At operation 1540, the virtual POS terminal 120 may provide, via the POS UI module 110, the transaction data to the cloud POS service 135. Prior to providing the transaction data to the POS UI module 110, the virtual POS terminal 120 may encrypt the transaction data using an RSA encryption algorithm, a triple data encryption algorithm (3DES), a secure hash algorithm (SHA), a format preserving encryption algorithm, elliptic curve cryptography, an Advanced Encryption Standard (AES) algorithm, and/or according to any other type of encryption method. In response to properly validating the cryptographic client certificate and decrypting the authentication challenge, the cloud POS service 135 may solicit a PIN from the POS UI module 110. The cryptographic client certificate may be validated in a same or similar manner as discussed previously with regard to validating the merchant 140 identity using the cryptographic merchant certificate.

At operation 1545, the virtual POS terminal 120 may receive, via the POS UI module 110, updated transaction terms from the cloud POS server 135. In various embodiments, the updated transaction terms may be a stricter version of the transaction terms required by the merchant 140 and/or the payment acquiring service 145 and the transaction terms provided by the virtual POS terminal 120 at operation 1540. In such embodiments, the updated transaction terms may include transaction terms that are common to both the transaction terms required by the selected payment credential and the transaction terms required by the merchant 140 (or required by the payment acquiring service 145), as well as any transaction terms that are required by the selected payment credential or the merchant 140/payment acquiring service 145 that are not included in the transaction terms of the other entity. For example, if the selected payment credential requires a user to enter a PIN for POS transactions that are more than $50, and the merchant 140 requires a user to enter a PIN for POS transactions that are more than $25, then the updated transaction terms may require a user to enter a PIN for a POS transaction having a payment amount that is more than $25. By way of another example, if the selected payment credential requires a user to enter a PIN and a cardholder birthdate for POS transactions that are more than $50, and the merchant 140 only requires a user to enter a PIN for POS transactions that are more than $50, then the updated transaction terms may require a user to enter a PIN and a cardholder birthdate for transaction that are more than $50. In various embodiments, the virtual POS terminal 120 may accept or deny the updated transaction terms, wherein the virtual POS terminal 120 may process the POS transaction according to the transaction terms delineated by the selected payment credential if the virtual POS terminal 120 denies the updated transaction terms, or the virtual POS terminal 120 may process the POS transaction using the updated transaction terms if the virtual POS terminal 120 accepts the updated transaction terms.

At operation 1550, the virtual POS terminal 120 may generate and encrypt payment data. In various embodiments, the payment data may be generated and encrypted in response to properly validating a PIN and/or other like security information as required by the updated transaction terms. In various embodiments, the payment data may include transaction settlement authorization information (e.g., billing information such as payment amount, currency type, account number, billing/payment address, shipping address, and/or other like cardholder data) a digital signature associated with the payment credential and/or the computing device 105, and/or other like information. Once generated, the payment data may be encrypted using an RSA encryption algorithm, a triple data encryption algorithm (3DES), a secure hash algorithm (SHA), a format preserving encryption algorithm, elliptic curve cryptography, an Advanced Encryption Standard (AES) algorithm, and/or according to any other type of encryption method. At operation 1555, the virtual POS terminal 120 may provide, via the POS UI module 110, the encrypted payment data to the cloud POS service 135. Once the virtual POS terminal 120 provides the encrypted payment data, the computing device 105 may proceed back to operation 1505 to receive, via the POS UI module 110, a transaction initiation from the cloud POS service 135.

Figure 16:
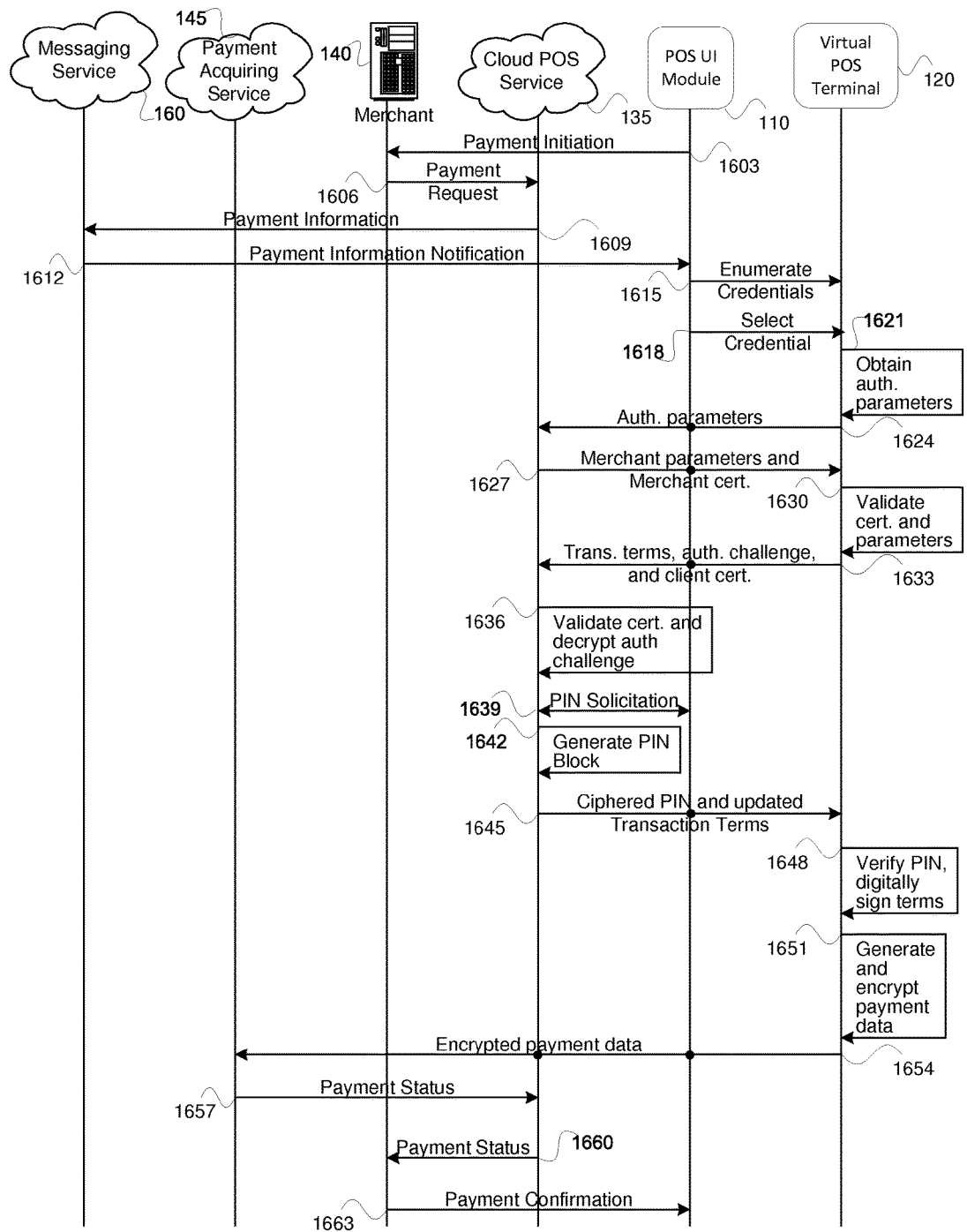
FIG. 16 illustrates a flow diagram illustrating a POS transaction using the virtual POS terminal, in accordance with various embodiments.

FIG. 16 is a flowchart illustrating an example process 1400 of processing a POS transaction, in accordance with various embodiments. For illustrative purposes, the operations of process 1600 will be described as being performed by the various elements as described with respect to FIGS. 1-3. However, it should be noted that other similar devices, such as the computing device 105A as described with regard to FIGS. 4-5, may operate the process 1600 as described below. While particular examples and orders of operations are illustrated in FIG. 16, in various embodiments, these operations may be re-ordered, broken into additional operations, combined, and/or omitted altogether.

Referring to FIG. 16, at operation 1603, the POS UI module 110 may transmit a payment initiation to the merchant 140. In various embodiments, operation 1603 may be performed during an ecommerce checkout procedure on a website associated with the merchant 140. In response to the payment initiation, at operation 1606, the merchant 140 may transmit a payment request to the cloud POS service 135.

At operation 1609, the cloud POS service 135 may transmit payment information to the messaging service 160. The payment information may include client device identification information (e.g., MAC address of the computing device 105, IP address of the computing device 105, and/or any other type of identifier), merchant identification information (e.g., MAC address of the merchant 140, IP address of the merchant 140, and/or any other like identifier), a POS transaction amount (e.g., a purchase price), a currency type for the POS transaction, merchant-accepted payment credentials, and/or other like POS transaction-related data. At operation 1612, the messaging service 160 may transmit the payment information notification to the POS UI module 110.

At operation 1615, the POS UI module 110 may enumerate the payment credentials. In various embodiments, the POS UI module 110 may query the payment credential DB 125 via the virtual POS terminal 120 to obtain a list of one or more payment credentials stored in the payment credential DB 125 that match the merchant-accepted payment credentials contained in the payment information notification.

At operation 1618, the POS UI module 110 may receive a selection of the one or more enumerated payment credentials, and may provide the selection of the one or more enumerated payment credentials to the virtual POS terminal 120. At operation 1621, the virtual POS terminal 120 may obtain one or more authentication parameters and/or other like information associated with the selected payment credential from the payment credential DB 125. As discussed previously, the authentication parameters may be security measures, defined by the selected payment credential, that are required for authenticating entities and/or communicating data between entities. At operation 1624, the virtual POS terminal 120 may provide authentication parameters to the POS UI module 110, which in turn may transmit the authentication parameters to the cloud POS service 135.

At operation 1627, the cloud POS service 135 may transmit merchant parameters and a merchant certificate to the POS UI module 110, which in turn may provide the merchant parameters and the merchant certificate to the virtual POS terminal 120. The merchant parameters may be security measures, defined by the merchant 140 and/or the payment acquiring service 145, that are required for authenticating entities and/or communicating data between entities. In various embodiments, the stricter security requirements between the authentication parameters and the merchant parameters may be used to authenticate entities, encrypt payment data, encode data packets containing the payment data, and/or the like.

At operation 1630, the virtual POS terminal 1430 may validate the merchant certificate and the merchant parameters. Upon properly validating the merchant certificate and the merchant parameters, at operation 1633, the virtual POS terminal may provide transaction terms, an authentication challenge and a cryptographic client certificate to the POS UI module 110, which in turn may transmit the transaction terms, the authentication challenge and the cryptographic client certificate to the cloud POS server 135.

At operation 1636, the cloud POS service 135 may validate the cryptographic client certificate and decrypt the authentication challenge. Upon properly decrypting the authentication challenge and properly validating the cryptographic client certificate, at operation 1639, the cloud POS service 135 may transmit a PIN solicitation to the POS UI module 110, and in response, the POS UI module 110 may transmit an inputted PIN to the cloud POS service 135. At operation 1642, the cloud POS service 135 may generate a PIN block based on the PIN received during the PIN solicitation. In various embodiments, the user may be required to enter a PIN in order to authorize use of the selected payment credential for the POS transaction. The PIN may be issued to the user by an issuer of the payment credential and may be used to authenticate the user's identity. In typical POS transactions, the cardholder is usually required to enter their PIN into a standalone physical POS terminal, the standalone physical POS terminal encodes the PIN into a PIN block and sends the PIN block to the merchant domain 130 for payment processing. In typical POS transactions where the payment credential is a smart card that includes a EMV chip, the cardholder is usually required to enter their PIN into the standalone physical POS terminal, and the standalone physical POS terminal sends the PIN to the to the smart card to check if the PIN is correct, wherein the smart card sends the result to the terminal so that the transaction continues if the PIN is correct. According to various example embodiments, when the user of the computing device 105 enters a PIN, the PIN may be encoded into a PIN block to protect the PIN during transmission between the POS UI module 110 and the cloud POS service 135. In such embodiments, the PIN may be enciphered/deciphered and communicated according to ISO 9564, one or more EMV standards, and/or any other like standard. According to other embodiments, the payment credential DB 125 may store a PIN associated with the selected payment credential, and when the user of the computing device 105 enters a PIN, the entered PIN may be checked against the stored PIN. In some embodiments, the PIN may not be required to be enciphered when shared between the POS UI module 110 and the virtual POS terminal 120, which may reduce the amount of computational resources used for processing the POS transaction. It should be noted that in other embodiments, other types of authentication methods may be used instead of, or in addition to using a PIN to authorize use payment credentials.

At operation 1645, the cloud POS service 135 may transmit the ciphered PIN and updated transaction terms to the POS UI module 110, which in turn, may provide the ciphered PIN and the updated transaction terms to the virtual POS terminal 120. At operation 1648, the virtual POS terminal 120 may verify the PIN and digitally sign the updated transaction terms.

At operation 1651, the virtual POS terminal 120 may generate and encrypt payment data. In various embodiments, the payment data may be encrypted according to EMV standards. At operation 1654, the virtual POS terminal 120 may provide the encrypted payment data to the POS UI, which in turn, may transmit the encrypted payment data to the cloud virtual POS terminal 135, which in turn, may transmit the encrypted payment data to the acquirer 145. At operation 1657, the acquirer 145 may transmit a payment status message to the cloud POS service 135. At operation 1660, the cloud POS service 135 may transmit a payment status message to the merchant 140. At operation 1663, the merchant 140 may transmit a payment confirmation to the POS UI module 110.

Some non-limiting Examples are provided below.

Example 1 may include a computing device comprising a point of sale, POS, user interface, UI, module to operate on at least one processor to receive a transaction initiation, and provide a selection of a payment credential to be used to process a POS transaction. The computing device comprises a trusted execution environment, communicatively coupled with the POS UI module, to process the POS transaction in response to the selection of the payment credential. The trusted execution environment comprises a payment credential storage unit to store the selected payment credential; and a virtual POS terminal to validate a merchant associated with the transaction initiation, process the POS transaction using the selected payment credential to generate payment data, and encrypt the payment data. The POS UI module is further to receive the encrypted payment data from the virtual POS terminal, and communicate the encrypted payment data to a network element.

Example 2 may include the computing device of the preceding example, and/or according to any example disclosed herein, wherein the POS UI module is to receive a transaction initiation that indicates one or more payment options to be used for the POS transaction, and the selected payment credential is to match one of the one or more payment options.

Example 3 may include the computing device of any of the preceding examples, and/or according to any example disclosed herein, wherein the POS UI module is to provide a selected payment credential that defines authentication parameters required to validate the merchant identity and the trusted execution environment is to process the POS transaction using the payment credential, wherein the virtual POS terminal is to provide the authentication parameters to the POS UI module, and the POS UI module is to provide the authentication parameters to the network element.

Example 4 may include the computing device of any of the preceding examples, and/or according to any example disclosed herein, wherein the POS UI module is to receive a cryptographic merchant certificate wherein the merchant certificate is based on the authentication parameters, and the virtual POS terminal is to decrypt the cryptographic merchant certificate to validate the merchant, and upon validation of the merchant, the virtual POS terminal is to generate and encrypt transaction data, wherein the transaction data includes a cryptographic client certificate, payment credential transaction terms defined by the authentication parameters, and a merchant authentication challenge.

Example 5 may include the computing device of any of the preceding examples, and/or according to any example disclosed herein, wherein the POS UI module is to receive a personal identification number, PIN, solicitation upon proper decryption of the cryptographic client certificate by the network element, and upon proper decryption of the merchant authentication challenge, and in response to PIN solicitation, the POS UI module is to provide a UI to input a PIN, and communicate the input PIN to the network element, wherein the POS UI module is to receive a PIN block and updated transaction terms upon validation of the input PIN.

Example 6 may include the computing device of any of the preceding examples, and/or according to any example disclosed herein, wherein the POS UI module is to receive updated transaction terms that are based on a combination of the payment credential transaction terms and merchant required transaction terms, and provide the updated transaction terms to the virtual POS terminal, and the virtual POS terminal is to accept or deny the updated transaction terms, process the POS transaction according to the payment credential transaction terms when the virtual POS terminal denies the updated transaction terms, and process the POS transaction according to the updated transaction terms when the virtual POS terminal accepts the updated transaction terms.

Example 7 may include the computing device of any of the preceding examples, and/or according to any example disclosed herein, wherein the POS UI module is to receive updated transaction terms that include transaction terms which are common to both the payment credential transaction terms and merchant required transaction terms, and any transaction terms that are required by one of the payment credential transaction terms or the merchant required transaction terms but not including the other one of the payment credential transaction terms or the merchant required transaction terms, and provide the updated transaction terms to the virtual POS terminal, and the virtual POS terminal is to process the POS transaction according to the updated transaction terms.

Example 8 may include the computing device of any of the preceding examples, and/or according to any example disclosed herein, wherein the POS UI module is to receive PIN block that is enciphered using one of format 0, format 1, format 2, or format 3 in accordance with International Organization for Standardization (ISO) 9564.

Example 9 may include the computing device of any of the preceding examples, and/or according to any example disclosed herein, wherein the virtual POS terminal is to receive the PIN block from the POS UI module, decipher the PIN block, and upon a proper decipher of the PIN block, the virtual POS terminal is to generate the payment data wherein the payment data includes a digital signature associated with the payment credential and a payment address associated with the payment credential.

Example 10 may include the computing device of any of the preceding examples, and/or according to any example disclosed herein, wherein the POS UI module is to receive a payment confirmation from the merchant when the encrypted payment information is properly decrypted by a payment acquiring service associated with the payment credential.

Example 11 may include the computing device of any of the preceding examples, and/or according to any example disclosed herein, wherein the payment credential storage unit is to store a plurality of payment credentials, and the POS UI module is to display a set of the plurality of payment credentials based on information contained in the transaction initiation.

Example 12 may include the computing device of any of the preceding examples, and/or according to any example disclosed herein, wherein the payment credential storage unit is to store, in association with each of the plurality of payment credentials, information indicating one or more jurisdictions in which each of the plurality of payment credentials are accepted, and the POS UI module is to display ones of the plurality of payment credentials that are accepted within a jurisdiction of the merchant based on a geographic location of the merchant, wherein the information contained in the transaction initiation includes information indicating the geographic location of the merchant.

Example 13 may include the computing device of any of the preceding examples, and/or according to any example disclosed herein, wherein the payment credential storage unit is to store a plurality of passcodes in association with a corresponding one of a plurality of payment credentials wherein the selected payment credential is one of the plurality of payment credentials, and the passcode stored in association with the selected payment credential is to be entered to authorize use of the selected payment credential, and wherein the POS UI module is to provide a UI for input of passcodes.

Example 14 may include the computing device of any of the preceding examples, and/or according to any example disclosed herein, wherein the POS UI module is to receive a transaction initiation that includes a purchase price of the POS transaction and a currency to be used to process the POS transaction.

Example 15 may include the computing device of any of the preceding examples, and/or according to any example disclosed herein, wherein the trusted execution environment comprises another processor, the virtual POS terminal is to operate on the other processor to process the POS transaction, and the POS UI module is an only module communicatively coupled with the virtual POS terminal.

Example 16 may include the computing device of any of the preceding examples, and/or according to any example disclosed herein, wherein the trusted execution environment is one of Intel® Management Engine, Intel® Software Guard Extensions, or Intel® Converged Security Engine (CSE).

Example 17 may include the computing device of any of the preceding examples, and/or according to any example disclosed herein, wherein the POS UI module is to receive the transaction initiation via a text message or a messaging service message wherein a unique identifier of the computing device is provided by a user of the computing device to initialize the transaction initiation.

Example 18 may include the computing device of any of the preceding examples, and/or according to any example disclosed herein, wherein the text message is one of a short message service (SMS) message or a multimedia messaging service (MMS) message, and the messaging service message is a push notification.

Example 19 may include a computer-implemented method for processing a point of sale, POS, transaction. The method may comprise receiving, by a virtual POS terminal within a trusted execution environment of a computing device, a transaction initiation from a network element via a POS user interface, UI, module wherein the transaction initiation indicates the POS transaction and one or more payment options to be used for processing the POS transaction; receiving, by the virtual POS terminal from the POS UI module, a selection of a payment credential matching one of the one or more payment options; obtaining, by the virtual POS terminal, the selected payment credential from within a payment credential storage unit located in the trusted execution environment; validating, by the virtual POS terminal, a merchant domain associated with the transaction initiation; encrypting, by the virtual POS terminal, payment data when the merchant domain is properly validated; and providing, by the virtual POS terminal, the encrypted payment data to the POS UI module wherein the POS UI module communicates the encrypted payment data to the network element.

Example 20 may include the method of the preceding example, and/or according to any example disclosed herein, wherein the payment credential storage unit stores a plurality of payment credentials and wherein obtaining the selected payment credential comprises obtaining one of the plurality of payment credentials.

Example 21 may include the method of any of the preceding examples, and/or according to any example disclosed herein, wherein the selected payment credential defines authentication parameters required to validate the merchant identity and process the POS transaction using the payment credential, and the method further comprises providing the authentication parameters to the POS UI module, wherein the POS UI module is to provide the authentication parameters to the network element.

Example 22 may include the method of any of the preceding examples, and/or according to any example disclosed herein, further comprising receiving, via the POS UI module, a cryptographic merchant certificate wherein the merchant certificate is based on the authentication parameters, wherein the validating comprises decrypting the cryptographic merchant certificate; generating transaction data upon validation of the merchant domain, wherein the transaction data includes a cryptographic client certificate, payment credential transaction terms defined by the authentication parameters, and a merchant authentication challenge; and encrypting the transaction data.

Example 23 may include the method of any of the preceding examples, and/or according to any example disclosed herein, further comprising receiving, from the network element via the POS UI module, a PIN block; deciphering the PIN block; and upon properly deciphering the PIN block, generating the payment data wherein the payment data includes a digital signature associated with the payment credential and a payment address associated with the payment credential.

Example 24 may include the method of any of the preceding examples, and/or according to any example disclosed herein, wherein the payment credential storage unit stores a plurality of passcodes in association with a corresponding one of a plurality of payment credentials, wherein each of the plurality of passcodes is to be entered to authorize use of the corresponding one of the plurality of payment credentials, and the selected payment credential is one of the plurality of payment credentials, and the method further comprises providing an indication to the POS UI module to generate a UI for inputting passcodes; receiving an input passcode from the POS UI module; determining whether the input passcode is equal to a passcode stored in association with the selected payment credential; and authorizing the selected payment credential to be used for processing the POS transaction when the input passcode is determined to be equal to the passcode stored in association with the selected payment credential.

Example 25 may include the method of any of the preceding examples, and/or according to any example disclosed herein, wherein receiving a transaction initiation comprises receiving a transaction initiation that includes a purchase price of the POS transaction and a currency to be used to process the POS transaction.

Example 26 may include the method of any of the preceding examples, and/or according to any example disclosed herein, wherein the receiving of a transaction initiation, the receiving of a selection of a payment credential, the obtaining, the validating, the encrypting and the providing are performed by the virtual POS terminal operating on a secure processor of the trusted execution environment, with the POS UI module being an only interface communicatively coupled with the virtual POS terminal.

Example 27 may include the method of any of the preceding examples, and/or according to any example disclosed herein, further comprising receiving, by the POS UI module, the transaction initiation via a text message or a messaging service message that includes a unique identifier of the computing device provided by a user of the computing device.

Example 28 may include at least one non-transitory computer-readable medium including instructions to cause a computing device, in response to execution of the instructions by the computing device, to perform the method of any of the preceding examples.

Example 29 may include a system comprising a computing device and a cloud trusted execution environment. The computing device may comprise a point of sale, POS, user interface, UI, module to operate on at least one processor to receive a transaction initiation, and provide a selection of a payment credential to be used to process a POS transaction. Cloud trusted execution environment may include a trusted execution environment, communicatively coupled with the POS UI module, to process the POS transaction in response to the selection of the payment credential. The trusted execution environment comprises a payment credential storage unit to store the selected payment credential; and a virtual POS terminal to validate a merchant associated with the transaction initiation, process the POS transaction using the selected payment credential to generate payment data, and encrypt the payment data. The POS UI module is further to receive the encrypted payment data from the virtual POS terminal, and communicate the encrypted payment data to a network element.

Example 30 may include the system of the preceding example, and/or according to any example disclosed herein, wherein the POS UI module is to receive a transaction initiation that indicates one or more payment options to be used for the POS transaction, and the selected payment credential is to match one of the one or more payment options.

Example 31 may include the system of any of the preceding examples, and/or according to any example disclosed herein, wherein the POS UI module is to provide a selected payment credential that defines authentication parameters required to validate the merchant identity and the trusted execution environment is to process the POS transaction using the payment credential, wherein the virtual POS terminal is to provide the authentication parameters to the POS UI module, and the POS UI module is to provide the authentication parameters to the network element.

Example 32 may include the system of any of the preceding examples, and/or according to any example disclosed herein, wherein the POS UI module is to receive a cryptographic merchant certificate wherein the merchant certificate is based on the authentication parameters, and the virtual POS terminal is to decrypt the cryptographic merchant certificate to validate the merchant, and upon validation of the merchant, the virtual POS terminal is to generate and encrypt transaction data, wherein the transaction data includes a cryptographic client certificate, payment credential transaction terms defined by the authentication parameters, and a merchant authentication challenge.

Example 33 may include the system of any of the preceding examples, and/or according to any example disclosed herein, wherein the POS UI module is to receive a personal identification number, PIN, solicitation upon proper decryption of the cryptographic client certificate by the network element, and upon proper decryption of the merchant authentication challenge, and in response to PIN solicitation, the POS UI module is to provide a UI to input a PIN, and communicate the input PIN to the network element, wherein the POS UI module is to receive a PIN block and updated transaction terms upon validation of the input PIN.

Example 34 may include the system of any of the preceding examples, and/or according to any example disclosed herein, wherein the POS UI module is to receive updated transaction terms that are based on a combination of the payment credential transaction terms and merchant required transaction terms, and provide the updated transaction terms to the virtual POS terminal, and the virtual POS terminal is to accept or deny the updated transaction terms, process the POS transaction according to the payment credential transaction terms when the virtual POS terminal denies the updated transaction terms, and process the POS transaction according to the updated transaction terms when the virtual POS terminal accepts the updated transaction terms.

Example 35 may include the system of any of the preceding examples, and/or according to any example disclosed herein, wherein the POS UI module is to receive updated transaction terms that include transaction terms which are common to both the payment credential transaction terms and merchant required transaction terms, and any transaction terms that are required by one of the payment credential transaction terms or the merchant required transaction terms but not including the other one of the payment credential transaction terms or the merchant required transaction terms, and provide the updated transaction terms to the virtual POS terminal, and the virtual POS terminal is to process the POS transaction according to the updated transaction terms.

Example 36 may include the system of any of the preceding examples, and/or according to any example disclosed herein, wherein the POS UI module is to receive PIN block that is enciphered using one of format 0, format 1, format 2, or format 3 in accordance with International Organization for Standardization (ISO) 9564.

Example 37 may include the system of any of the preceding examples, and/or according to any example disclosed herein, wherein the virtual POS terminal is to receive the PIN block from the POS UI module, decipher the PIN block, and upon a proper decipher of the PIN block, the virtual POS terminal is to generate the payment data wherein the payment data includes a digital signature associated with the payment credential and a payment address associated with the payment credential.

Example 38 may include the system of any of the preceding examples, and/or according to any example disclosed herein, wherein the POS UI module is to receive a payment confirmation from the merchant when the encrypted payment information is properly decrypted by a payment acquiring service associated with the payment credential.

Example 39 may include the system of any of the preceding examples, and/or according to any example disclosed herein, wherein the payment credential storage unit is to store a plurality of payment credentials, and the POS UI module is to display a set of the plurality of payment credentials based on information contained in the transaction initiation.

Example 40 may include the system of any of the preceding examples, and/or according to any example disclosed herein, wherein the payment credential storage unit is to store, in association with each of the plurality of payment credentials, information indicating one or more jurisdictions in which each of the plurality of payment credentials are accepted, and the POS UI module is to display ones of the plurality of payment credentials that are accepted within a jurisdiction of the merchant based on a geographic location of the merchant, wherein the information contained in the transaction initiation includes information indicating the geographic location of the merchant.

Example 41 may include the system of any of the preceding examples, and/or according to any example disclosed herein, wherein the payment credential storage unit is to store a plurality of passcodes in association with a corresponding one of a plurality of payment credentials wherein the selected payment credential is one of the plurality of payment credentials, and the passcode stored in association with the selected payment credential is to be entered to authorize use of the selected payment credential, and wherein the POS UI module is to provide a UI for input of passcodes.

Example 42 may include the system of any of the preceding examples, and/or according to any example disclosed herein, wherein the POS UI module is to receive a transaction initiation that includes a purchase price of the POS transaction and a currency to be used to process the POS transaction.

Example 43 may include the system of any of the preceding examples, and/or according to any example disclosed herein, wherein the trusted execution environment comprises another processor, the virtual POS terminal is to operate on the other processor to process the POS transaction, and the POS UI module is an only module communicatively coupled with the virtual POS terminal.

Example 44 may include the system of any of the preceding examples, and/or according to any example disclosed herein, wherein the trusted execution environment is one of Intel® Management Engine, Intel® Software Guard Extensions, or Intel® Converged Security Engine (CSE).

Example 45 may include the system of any of the preceding examples, and/or according to any example disclosed herein, wherein the POS UI module is to receive the transaction initiation via a text message or a messaging service message wherein a unique identifier of the computing device is provided by a user of the computing device to initialize the transaction initiation.

Example 46 may include the system of any of the preceding examples, and/or according to any example disclosed herein, wherein the text message is one of a short message service (SMS) message or a multimedia messaging service (MMS) message, and the messaging service message is a push notification.

Example 47 may include a computer-implemented method for processing a point of sale, POS, transaction. The method may comprise receiving, by a virtual POS terminal within a trusted execution environment of a cloud trusted execution environment, a transaction initiation from a network element via a POS user interface, UI, module wherein the transaction initiation indicates the POS transaction and one or more payment options to be used for processing the POS transaction; receiving, by the virtual POS terminal from the POS UI module, a selection of a payment credential matching one of the one or more payment options; obtaining, by the virtual POS terminal, the selected payment credential from within a payment credential storage unit located in the trusted execution environment; validating, by the virtual POS terminal, a merchant domain associated with the transaction initiation; encrypting, by the virtual POS terminal, payment data when the merchant domain is properly validated; and providing, by the virtual POS terminal, the encrypted payment data to the POS UI module wherein the POS UI module communicates the encrypted payment data to the network element.

Example 48 may include the method of the preceding example, and/or according to any example disclosed herein, wherein the payment credential storage unit stores a plurality of payment credentials and wherein obtaining the selected payment credential comprises obtaining one of the plurality of payment credentials.

Example 49 may include the method of any of the preceding examples, and/or according to any example disclosed herein, wherein the selected payment credential defines authentication parameters required to validate the merchant identity and process the POS transaction using the payment credential, and the method further comprises providing the authentication parameters to the POS UI module, wherein the POS UI module is to provide the authentication parameters to the network element.

Example 50 may include the method of any of the preceding examples, and/or according to any example disclosed herein, further comprising receiving, via the POS UI module, a cryptographic merchant certificate wherein the merchant certificate is based on the authentication parameters, wherein the validating comprises decrypting the cryptographic merchant certificate; generating transaction data upon validation of the merchant domain, wherein the transaction data includes a cryptographic client certificate, payment credential transaction terms defined by the authentication parameters, and a merchant authentication challenge; and encrypting the transaction data.

Example 51 may include the method of any of the preceding examples, and/or according to any example disclosed herein, further comprising receiving, from the network element via the POS UI module, a PIN block; deciphering the PIN block; and upon properly deciphering the PIN block, generating the payment data wherein the payment data includes a digital signature associated with the payment credential and a payment address associated with the payment credential.

Example 52 may include the method of any of the preceding examples, and/or according to any example disclosed herein, wherein the payment credential storage unit stores a plurality of passcodes in association with a corresponding one of a plurality of payment credentials, wherein each of the plurality of passcodes is to be entered to authorize use of the corresponding one of the plurality of payment credentials, and the selected payment credential is one of the plurality of payment credentials, and the method further comprises providing an indication to the POS UI module to generate a UI for inputting passcodes; receiving an input passcode from the POS UI module; determining whether the input passcode is equal to a passcode stored in association with the selected payment credential; and authorizing the selected payment credential to be used for processing the POS transaction when the input passcode is determined to be equal to the passcode stored in association with the selected payment credential.

Example 53 may include the method of any of the preceding examples, and/or according to any example disclosed herein, wherein receiving a transaction initiation comprises receiving a transaction initiation that includes a purchase price of the POS transaction and a currency to be used to process the POS transaction.

Example 54 may include the method of any of the preceding examples, and/or according to any example disclosed herein, wherein the receiving of a transaction initiation, the receiving of a selection of a payment credential, the obtaining, the validating, the encrypting and the providing are performed by the virtual POS terminal operating on a secure processor of the trusted execution environment, with the POS UI module being an only interface communicatively coupled with the virtual POS terminal.

Example 55 may include the method of any of the preceding examples, and/or according to any example disclosed herein, further comprising receiving, by the POS UI module, the transaction initiation via a text message or a messaging service message that includes a unique identifier of the computing device provided by a user of the computing device.

Example 56 may include at least one non-transitory computer-readable medium including instructions to cause a computing device, in response to execution of the instructions by the computing device, to perform the method of any of the preceding examples.

Example 57 may include a computing device first means to receive a transaction initiation, and provide a selection of a payment credential to be used to process a POS transaction. The computing device comprises a second means, communicatively coupled with the first means, to process the POS transaction in response to the selection of the payment credential. The second means comprises a third means to store the selected payment credential; and a fourth means to validate a merchant associated with the transaction initiation, process the POS transaction using the selected payment credential to generate payment data, and encrypt the payment data. The first means is further to receive the encrypted payment data from the fourth means, and communicate the encrypted payment data to a network element.

Example 58 may include the computing device of the preceding example, and/or according to any example disclosed herein, wherein the first means is to receive a transaction initiation that indicates one or more payment options to be used for the POS transaction, and the selected payment credential is to match one of the one or more payment options.

Example 59 may include the computing device of any of the preceding examples, and/or according to any example disclosed herein, wherein the first means is to provide a selected payment credential that defines authentication parameters required to validate the merchant identity and the second means is to process the POS transaction using the payment credential, wherein the fourth means is to provide the authentication parameters to the first means, and the first means is to provide the authentication parameters to the network element.

Example 60 may include the computing device of any of the preceding examples, and/or according to any example disclosed herein, wherein the first means is to receive a cryptographic merchant certificate wherein the merchant certificate is based on the authentication parameters, and the fourth means is to decrypt the cryptographic merchant certificate to validate the merchant, and upon validation of the merchant, the fourth means is to generate and encrypt transaction data, wherein the transaction data includes a cryptographic client certificate, payment credential transaction terms defined by the authentication parameters, and a merchant authentication challenge.

Example 61 may include the computing device of any of the preceding examples, and/or according to any example disclosed herein, wherein the first means is to receive a personal identification number, PIN, solicitation upon proper decryption of the cryptographic client certificate by the network element, and upon proper decryption of the merchant authentication challenge, and in response to PIN solicitation, the first means is to provide a UI to input a PIN, and communicate the input PIN to the network element, wherein the first means is to receive a PIN block and updated transaction terms upon validation of the input PIN.

Example 62 may include the computing device of any of the preceding examples, and/or according to any example disclosed herein, wherein the first means is to receive updated transaction terms that are based on a combination of the payment credential transaction terms and merchant required transaction terms, and provide the updated transaction terms to the fourth means, and the fourth means is to accept or deny the updated transaction terms, process the POS transaction according to the payment credential transaction terms when the fourth means denies the updated transaction terms, and process the POS transaction according to the updated transaction terms when the fourth means accepts the updated transaction terms.

Example 63 may include the computing device of any of the preceding examples, and/or according to any example disclosed herein, wherein the first means is to receive updated transaction terms that include transaction terms which are common to both the payment credential transaction terms and merchant required transaction terms, and any transaction terms that are required by one of the payment credential transaction terms or the merchant required transaction terms but not including the other one of the payment credential transaction terms or the merchant required transaction terms, and provide the updated transaction terms to the fourth means, and the fourth means is to process the POS transaction according to the updated transaction terms.

Example 64 may include the computing device of any of the preceding examples, and/or according to any example disclosed herein, wherein the first means is to receive PIN block that is enciphered using one of format 0, format 1, format 2, or format 3 in accordance with International Organization for Standardization (ISO) 9564.

Example 65 may include the computing device of any of the preceding examples, and/or according to any example disclosed herein, wherein the fourth means is to receive the PIN block from the first means, decipher the PIN block, and upon a proper decipher of the PIN block, the fourth means is to generate the payment data wherein the payment data includes a digital signature associated with the payment credential and a payment address associated with the payment credential.

Example 66 may include the computing device of any of the preceding examples, and/or according to any example disclosed herein, wherein the first means is to receive a payment confirmation from the merchant when the encrypted payment information is properly decrypted by a payment acquiring service associated with the payment credential.

Example 67 may include the computing device of any of the preceding examples, and/or according to any example disclosed herein, wherein the third means is to store a plurality of payment credentials, and the first means is to display a set of the plurality of payment credentials based on information contained in the transaction initiation.

Example 68 may include the computing device of any of the preceding examples, and/or according to any example disclosed herein, wherein the third means is to store, in association with each of the plurality of payment credentials, information indicating one or more jurisdictions in which each of the plurality of payment credentials are accepted, and the first means is to display ones of the plurality of payment credentials that are accepted within a jurisdiction of the merchant based on a geographic location of the merchant, wherein the information contained in the transaction initiation includes information indicating the geographic location of the merchant.

Example 69 may include the computing device of any of the preceding examples, and/or according to any example disclosed herein, wherein the third means is to store a plurality of passcodes in association with a corresponding one of a plurality of payment credentials wherein the selected payment credential is one of the plurality of payment credentials, and the passcode stored in association with the selected payment credential is to be entered to authorize use of the selected payment credential, and wherein the first means is to provide a UI for input of passcodes.

Example 70 may include the computing device of any of the preceding examples, and/or according to any example disclosed herein, wherein the first means is to receive a transaction initiation that includes a purchase price of the POS transaction and a currency to be used to process the POS transaction.

Example 71 may include the computing device of any of the preceding examples, and/or according to any example disclosed herein, wherein the second means comprises another processor, the fourth means is to operate on the other processor to process the POS transaction, and the first means is an only module communicatively coupled with the fourth means.

Example 72 may include the computing device of any of the preceding examples, and/or according to any example disclosed herein, wherein the second means is one of Intel® Management Engine, Intel® Software Guard Extensions, or Intel® Converged Security Engine (CSE).

Example 73 may include the computing device of any of the preceding examples, and/or according to any example disclosed herein, wherein the first means is to receive the transaction initiation via a text message or a messaging service message wherein a unique identifier of the computing device is provided by a user of the computing device to initialize the transaction initiation.

Example 74 may include the computing device of any of the preceding examples, and/or according to any example disclosed herein, wherein the text message is one of a short message service (SMS) message or a multimedia messaging service (MMS) message, and the messaging service message is a push notification.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

We claim:

1. A mobile computing system comprising:
   application processor circuitry arranged to operate a point of sale (POS) user interface (UI) module to:
      receive a transaction initiation, and
      provide a selection of a payment credential to be used to process a POS transaction;
   a trusted execution environment (TEE), the TEE communicatively coupled with the application processor circuitry, the TEE arranged to process the POS transaction in response to the selection of the payment credential, wherein the TEE comprises:
      a payment credential storage unit arranged to store one or more payment credentials including the selected payment credential; and
      a virtual POS terminal arranged to validate a merchant associated with the transaction initiation, obtain the selected payment credential from the payment credential storage unit, process the POS transaction using the selected payment credential to generate payment data, and encrypt the payment data,
   wherein the POS UI module is arranged to receive the encrypted payment data from the virtual POS terminal; and
   network interface circuitry communicatively coupled with the application processor circuitry, the network interface circuitry arranged to communicate the encrypted payment data to a merchant system owned or operated by the merchant.

2. The computing system of claim 1, wherein the transaction initiation indicates one or more payment options to be used for the POS transaction, and the selected payment credential is to match one of the one or more payment options.

3. The computing system of claim 1, wherein the POS UI module is arranged to provide a selected payment credential that defines authentication parameters required to validate a merchant identity of the merchant and the trusted execution environment is to process the POS transaction using the payment credential, wherein the virtual POS terminal is arranged to provide the authentication parameters to the network interface circuitry via the POS UI module for transmission to the merchant system.

4. The computing system of claim 3, wherein:
   the POS UI module is arranged to receive, via the network interface circuitry and the POS UI module, a cryptographic merchant certificate that is based on the authentication parameters, and
   the virtual POS terminal is arranged to decrypt the cryptographic merchant certificate to validate the merchant identity, and upon validation of the merchant identity, the virtual POS terminal is arranged to generate and encrypt transaction data, wherein the transaction data includes a cryptographic client certificate, payment credential transaction terms defined by the authentication parameters, and a merchant authentication challenge.

5. The computing system of claim 4, wherein the POS UI module is arranged to:
   receive, via the network interface circuitry and the POS UI module, a personal identification number (PIN) solicitation upon proper decryption of the cryptographic client certificate by the merchant system; and
   upon proper decryption of the merchant authentication challenge and in response to PIN solicitation, the POS UI module is arranged to:
      cause a UI to input a PIN to be generated and displayed; and
      provide the input PIN to the network interface circuitry via the POS UI module for transmission to the merchant system,
   wherein the POS UI module is arranged to receive, from the merchant system via the network interface circuitry, a PIN block and updated transaction terms upon validation of the input PIN.

6. The computing system of claim 5, wherein the updated transaction terms are based on a combination of the payment credential transaction terms and merchant required transaction terms, and wherein:
   the POS UI module is arranged to provide the updated transaction terms to the virtual POS terminal, and
   the virtual POS terminal is arranged to accept or deny the updated transaction terms, process the POS transaction according to the payment credential transaction terms when the virtual POS terminal denies the updated transaction terms, and process the POS transaction according to the updated transaction terms when the virtual POS terminal accepts the updated transaction terms.

7. The computing system of claim 5, wherein the updated transaction terms include transaction terms which are common to both the payment credential transaction terms and merchant required transaction terms, wherein any transaction terms are required by one of the payment credential transaction terms or the merchant required transaction terms but not included in the other one of the payment credential transaction terms or the merchant required transaction terms, and wherein:
   the POS UI module is arranged to provide the updated transaction terms to the virtual POS terminal, and
   the virtual POS terminal is arranged to process the POS transaction according to the updated transaction terms.

8. The computing system of claim 5 wherein the virtual POS terminal is arranged to receive the PIN block from the POS UI module, decipher the PIN block, and upon a proper decipher of the PIN block, the virtual POS terminal is arranged to generate the payment data wherein the payment data includes a digital signature associated with the payment credential and a payment address associated with the payment credential.

9. The computing system of claim 8, wherein the POS UI module is arranged to receive a payment confirmation from the merchant system via the network interface circuitry when the encrypted payment information is properly decrypted by a payment acquiring service associated with the payment credential.

10. The computing system of claim 1, wherein the payment credential storage unit is arranged to store a plurality of payment credentials, and the POS UI module is arranged to cause display of a set of the plurality of payment credentials based on information contained in the transaction initiation.

11. The computing system of claim 1, wherein the payment credential storage unit is arranged to store a plurality of passcodes in association with a corresponding one of a plurality of payment credentials wherein the selected payment credential is one of the plurality of payment credentials, and the passcode stored in association with the selected payment credential is to be entered to authorize use of the selected payment credential, and wherein the POS UI module is arranged to cause a UI for input of passcodes to be displayed.

12. The computing system of claim 1, wherein the transaction initiation includes a purchase price of the POS transaction and a currency to be used to process the POS transaction.

13. The computing system of claim 1, wherein the TEE is a tamper-resistant chipset including a secure processor, and the virtual POS terminal is arranged to operate on the secure processor to process the POS transaction, and the POS UI module is an only module outside of the TEE communicatively coupled with the virtual POS terminal.

14. The computing system of claim 1, wherein the TEE is one of Intel® Management Engine, Intel® Software Guard Extensions, or Intel® Converged Security Engine (CSE).

15. The computing system of claim 1, wherein the network interface circuitry is arranged to receive the transaction initiation via a text message or a messaging service message, wherein a unique identifier of the computing system is provided by a user of the computing system to initialize the transaction initiation.

16. The computing system of claim 15, wherein the text message is one of a short message service (SMS) message or a multimedia messaging service (MMS) message, and the messaging service message is a push notification.

17. One or more non-transitory computer-readable media (NTCRM) comprising instructions of a virtual point of sale (POS) terminal to process a POS transaction, wherein execution of the instructions by a computing device is to cause the computing device to operate the virtual POS terminal within a trusted execution environment (TEE) of the computing device to:
receive a transaction initiation from a merchant system via network interface circuitry of a computing system that includes the computing device and a POS user interface (UI) module operated by an application processor of the computing system, wherein the transaction initiation indicates the POS transaction and one or more payment options to be used for processing the POS transaction;
receive, from the POS UI module, a selection of a payment credential matching one of the one or more payment options;
obtain the selected payment credential from within a payment credential storage unit located in the TEE;
validate a merchant domain associated with the transaction initiation, the merchant domain including the merchant system;
encrypt payment data when the merchant domain is properly validated; and
provide the encrypted payment data to the network interface circuitry via the POS UI module for communication of the encrypted payment data to the merchant system.

18. The one or more NTCRM of claim 17, wherein the payment credential storage unit stores a plurality of payment credentials and wherein to obtain the selected payment credential, execution of the instructions is to cause the computing device to operate the virtual POS terminal within the TEE to obtain one of the plurality of payment credentials from the payment credential storage unit.

19. The one or more NTCRM of claim 17, wherein the selected payment credential defines authentication parameters required to validate a merchant identity of the merchant domain and process the POS transaction using the payment credential, and wherein execution of the instructions is to cause the computing device to operate the virtual POS terminal within the TEE to:
provide the authentication parameters to the network interface circuitry via the POS UI module for transmission to the merchant system.

20. The one or more NTCRM of claim 19, wherein execution of the instructions is to cause the computing device to operate the virtual POS terminal within the TEE to:
receive, from the merchant system via the network interface circuitry and the POS UI module, a cryptographic merchant certificate wherein the merchant certificate is based on the authentication parameters,
wherein, to validate the merchant domain, execution of the instructions is to cause the computing device to:
decrypt the cryptographic merchant certificate,
generate transaction data upon validation of the merchant domain, wherein the transaction data includes a cryptographic client certificate, payment credential transaction terms defined by the authentication parameters, and a merchant authentication challenge, and
encrypt the transaction data.

21. The one or more NTCRM of claim 20, wherein execution of the instructions is to cause the computing device to operate the virtual POS terminal within the TEE to:
receive, from the merchant system via the network interface circuitry and the POS UI module, a PIN block;
decipher the PIN block; and
generate, upon proper decipher of the PIN block, the payment data wherein the payment data includes a digital signature associated with the payment credential and a payment address associated with the payment credential.

22. The one or more NTCRM of claim 17, wherein the payment credential storage unit stores a plurality of passcodes in association with a corresponding one of a plurality of payment credentials, wherein each of the plurality of passcodes is to be entered to authorize use of the corresponding one of the plurality of payment credentials, and the selected payment credential is one of the plurality of payment credentials, and wherein execution of the instructions is to cause the computing device to operate the virtual POS terminal within the TEE to:
provide an indication to the POS UI module to generate and display a UI for inputting passcodes;
receive an input passcode from the POS UI module;
determine whether the input passcode is equal to a passcode stored in association with the selected payment credential; and
authorize the selected payment credential to be used for processing the POS transaction when the input passcode is determined to be equal to the passcode stored in association with the selected payment credential.

23. The one or more NTCRM of claim 17, wherein the transaction initiation includes a purchase price of the POS transaction and a currency to be used to process the POS transaction.

24. The one or more NTCRM of claim 17, wherein the computing device is a secure processor of the TEE, and wherein the POS UI module is to be operated by a host platform of a computing system including the secure processor, and the POS UI module is an only interface outside of the TEE that is communicatively coupled with the virtual POS terminal.

25. The one or more NTCRM of claim 17, wherein the transaction initiation is a text message or a messaging service message that includes a unique identifier of the computing device provided by a user of the computing device.

\* \* \* \* \*